(12) United States Patent
Bagheri et al.

(10) Patent No.: US 11,658,787 B2
(45) Date of Patent: *May 23, 2023

(54) METHOD AND APPARATUS FOR DOWNLINK CONTROL PHYSICAL STRUCTURE IN REDUCED LATENCY OPERATION

(71) Applicant: Motorola Mobility LLC, Chicago, IL (US)

(72) Inventors: Hossein Bagheri, Urbana, IL (US); Vijay Nangia, Woodbridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/359,563

(22) Filed: Jun. 27, 2021

(65) Prior Publication Data
US 2021/0328844 A1 Oct. 21, 2021

Related U.S. Application Data

(63) Continuation of application No. 16/006,846, filed on Jun. 13, 2018, now Pat. No. 11,075,785.

(Continued)

(51) Int. Cl.
*H04L 5/00* (2006.01)
*H04W 72/0446* (2023.01)
(Continued)

(52) U.S. Cl.
CPC .......... *H04L 5/0053* (2013.01); *H04L 5/0051* (2013.01); *H04W 72/005* (2013.01);
(Continued)

(58) Field of Classification Search
CPC ... H04L 5/0053; H04L 5/0051; H04L 5/0007; H04W 72/005; H04W 72/042; H04W 72/0446
See application file for complete search history.

(56) References Cited

U.S. PATENT DOCUMENTS

| 11,075,785 B2 * | 7/2021 | Bagheri ............ H04W 72/0446 |
| 2013/0201975 A1 | 8/2013 | Chen et al. |

(Continued)

OTHER PUBLICATIONS

3GPP Draft; R1-1612741_SPDCCH_V0, 3rd Generation Partnership Project (3GPP), Mobile Compei Ence Centre; 650, Route Des Lucioles; F-06921 Sophia-Antipolis Cedex; France vol. RAN WG1, No. Reno, USA; Nov. 14-19, 2016.

(Continued)

*Primary Examiner* — Jae Y Lee
(74) *Attorney, Agent, or Firm* — Loppnow & Chapa; Matthew C. Loppnow

(57) ABSTRACT

Control channel candidates can be transmitted in at least one shortened transmission time interval in a subframe and set of resource blocks corresponding to control channel candidates in the at least one shortened transmission time interval. A determination can be made about whether at least one resource block of the set of resource blocks at least partially overlaps with a broadcast control channel or signal. A determination can be made about control resource elements for transmission of a control channel candidate based on the determination about whether the at least one resource block of the set of resource blocks at least partially overlaps with the broadcast control channel or signal. The control channel candidate can be transmitted in the at least one shortened transmission time interval according to the determined control resource elements.

20 Claims, 17 Drawing Sheets

Related U.S. Application Data

(60) Provisional application No. 62/519,165, filed on Jun. 13, 2017.

(51) Int. Cl.
*H04W 72/04* (2023.01)
*H04W 72/00* (2023.01)

(52) U.S. Cl.
CPC ..... *H04W 72/042* (2013.01); *H04W 72/0446* (2013.01); *H04L 5/0007* (2013.01)

(56) References Cited

U.S. PATENT DOCUMENTS

2016/0270059 A1    9/2016   Chen et al.
2018/0049175 A1*   2/2018   Bagheri ................. H04L 43/08

OTHER PUBLICATIONS

Akbudak, European Search Report, European Application No. EP 22 17 5232, European Patent Office, The Hague, Jun. 30, 2022.

\* cited by examiner

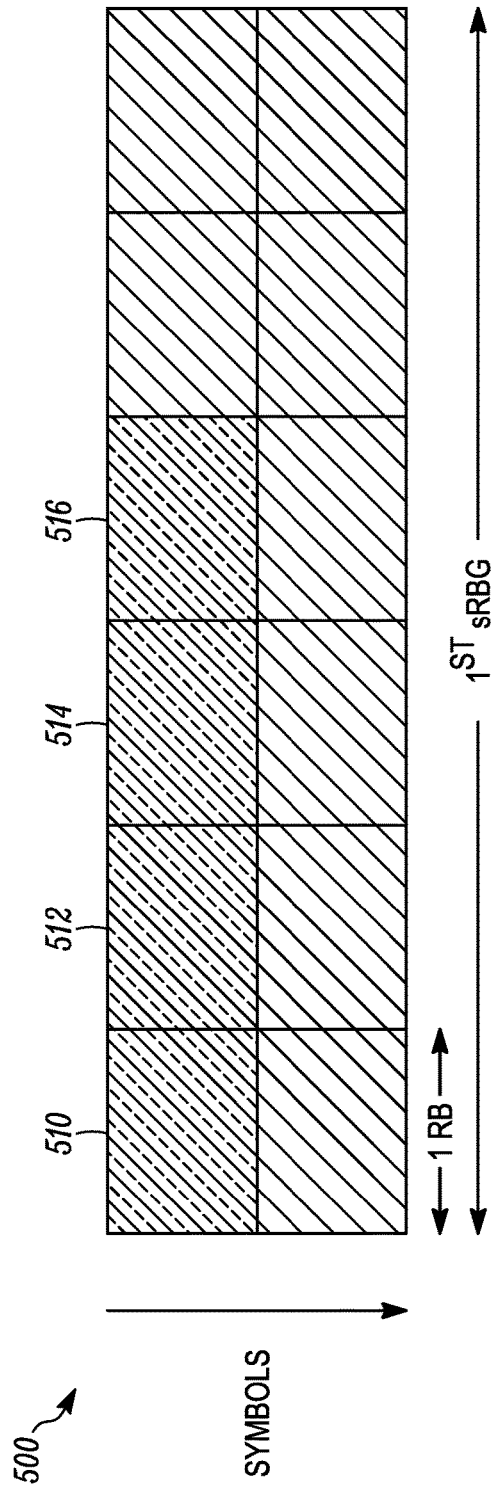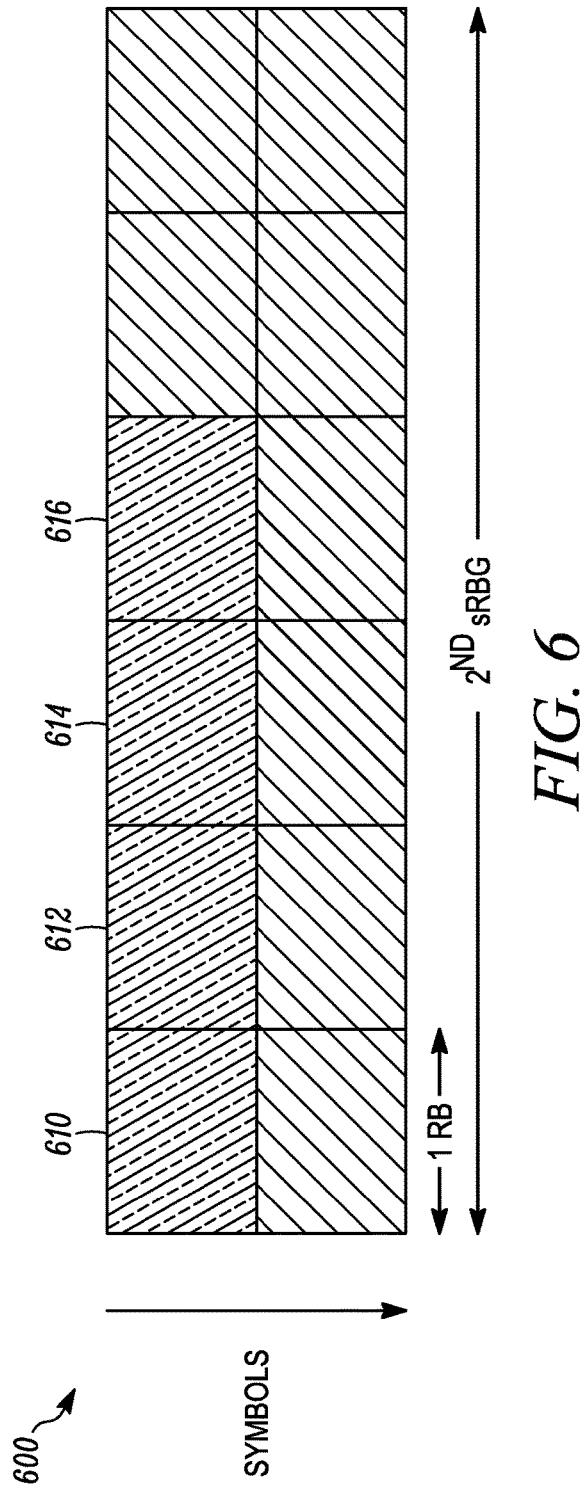

METHOD AND APPARATUS FOR DOWNLINK CONTROL PHYSICAL STRUCTURE IN REDUCED LATENCY OPERATION

BACKGROUND

1. Field

The present disclosure is directed to a method and apparatus for signaling on a wireless network. More particularly, the present disclosure is directed to a method and apparatus for downlink control physical structure in reduced latency operation.

2. Introduction

Presently, 5th Generation (5G) New Radio (NR) wireless systems, abbreviated 5G NR, offer improved wireless network technologies. 5G NR includes such technologies as millimeter wave bands, such as 26, 28, 38, and 60 GHz and can offer theoretical throughput as high as 20 gigabits per second, with median bandwidth being approximately 3.5 gigabits. 5G NR can utilize Multiple Input Multiple Output (MIMO), for example 64-256 antennas, to provide up to ten times the performance of $4^{th}$ Generation (4G) networks. In current 3rd Generation Partnership Project (3GPP) Long Term Evolution (LTE), time-frequency resources can be divided into subframes where each 1 ms subframe can comprise two 0.5 ms slots and each slot, such as with normal Cyclic Prefix (CP) duration, can comprise 7 Single-Carrier Frequency Division Multiple Access (SC-FDMA) symbols in time domain in uplink (UL) and 7 Orthogonal Frequency Division Multiplexing (OFDM) symbols in time domain in downlink (DL). In frequency domain, resources within a slot can be divided into Physical Resource Blocks (PRBs), where each resource block can span twelve contiguous subcarriers.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

FIG. 5 illustrates an example short Resource Block Group (sRBG), according to a possible embodiment;

FIG. 6 illustrates another example sRBG, according to a possible embodiment;

DETAILED DESCRIPTION

Figure 1:
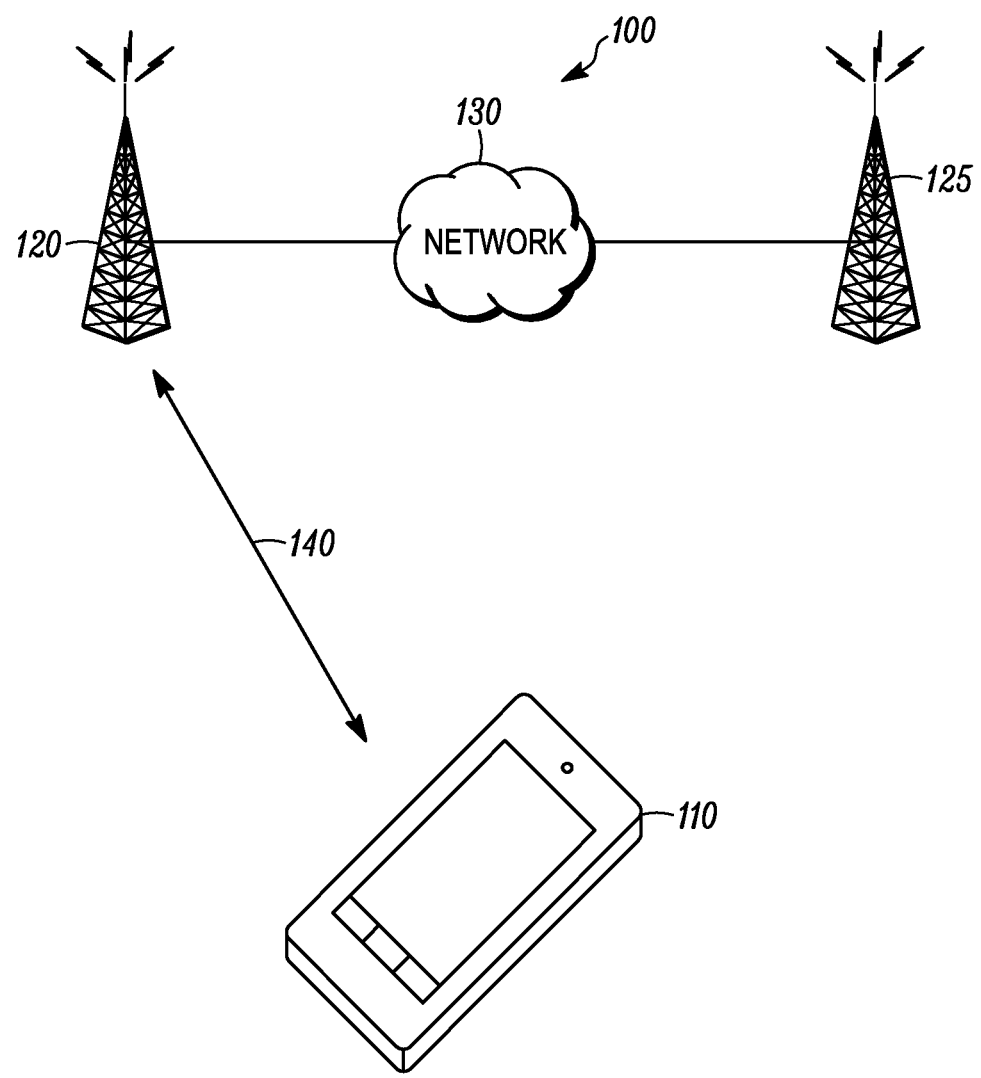
FIG. 1 is an example block diagram of a system, according to a possible embodiment.

Embodiments provide a method and apparatus for downlink signaling of a higher layer message. According to a possible embodiment, a higher layer message from a base station indicating to monitor a control channel using demodulation reference signals in a shortened transmission time interval in a subframe can be received, where the higher layer can be higher than a physical layer, and where the shortened transmission time interval can be shorter than a subframe-length transmission time interval. A first control channel candidate in the shortened transmission time interval can be attempted to be decoded, where the first control channel candidate can comprise a first shortened control channel element that can span a first set of shortened resource element groups in a frequency domain using a first demodulation reference signal on a first antenna port, where a first precoder can apply to all demodulation reference signal resource elements in the first set of shortened resource element groups, where the shortened control channel element can correspond to the shortened transmission time interval. A second control channel candidate in the shortened transmission time interval can be attempted to be decoded, where the second control channel candidate can comprise a second shortened control channel element that can span a second set of shortened resource element groups in the frequency domain using a second demodulation reference signal on a second antenna port, where a second precoder can apply to all demodulation reference signal resource elements in the second set of shortened resource element groups. A first shortened resource element group of the first set of shortened resource element groups can occupy a first set of resource elements in a given resource block in a first orthogonal frequency division multiplexing symbol of the shortened transmission time interval and a second shortened resource element group of the second set of shortened resource element groups can occupy a second set of resource elements, in the given resource block in a second orthogonal frequency division multiplexing symbol of the shortened transmission time interval, where the first orthogonal frequency division multiplexing symbol can be different from the second orthogonal frequency division multiplexing symbol.

Embodiments provide another method and another apparatus for downlink signaling of a higher layer message. According to a possible embodiment, a higher layer message indicating to monitor a control channel using demodulation reference signals in a shortened transmission time interval in a subframe can be transmitted by a device, where the higher layer can be higher than a physical layer, and where the shortened transmission time interval can be shorter than a subframe-length transmission time interval. A first control channel candidate in the shortened transmission time interval can be transmitted, where the first control channel candidate can comprise a first shortened control channel element that can span a first set of shortened resource element groups in a frequency domain using a first demodulation reference signal on a first antenna port, where a first precoder can apply to all demodulation reference signal resource elements in the first set of shortened resource element groups, where the shortened control channel element can correspond to the shortened transmission time interval. A second control channel candidate in the shortened transmission time interval can be transmitted, where the second control channel candidate can comprise a second shortened control channel element that can span a second set of shortened resource element groups in the frequency domain using a second demodulation reference signal on a second antenna port, where a second precoder can apply to all demodulation reference signal resource elements in the second set of shortened resource element groups. A first shortened resource element group of the first set of shortened resource element groups can occupy a first set of resource elements in a given resource block in a first orthogonal frequency division multiplexing symbol of the shortened transmission time interval and a second shortened resource element group of the second set of shortened resource element groups can occupy a second set of resource elements, in the given resource block in a second orthogonal frequency division multiplexing symbol of the shortened transmission time interval, where the first orthogonal frequency division multiplexing symbol can be different from the second orthogonal frequency division multiplexing symbol.

Embodiments provide another method and another apparatus for downlink signaling of a higher layer message. According to a possible embodiment, a higher layer message from a base station can be received, for monitoring control channel candidates in at least one shortened transmission time interval in a subframe and set of resource blocks corresponding to control channel candidates in the at least one shortened transmission time interval, where the higher layer can be higher than a physical layer, and where the shortened transmission time interval can be shorter than a subframe-length transmission time interval. Whether at least one resource block of the set of resource blocks at least partially overlaps with a broadcast control channel or signal can be determined. Control resource elements used for transmission of a control channel candidate can be based on the determination whether the at least one resource block of the set of resource blocks at least partially overlaps with the broadcast control channel or signal. The control channel candidate in the at least one shortened transmission time interval according to the determined control resource elements can be attempted to be decoded, wherein the control channel candidate comprises a shortened control channel element spanning a set of shortened resource element groups in a frequency domain.

Embodiments provide another method and another apparatus for downlink signaling of a higher layer message. According to a possible embodiment, a higher layer message for monitoring control channel candidates in at least one shortened transmission time interval in a subframe and set of resource blocks corresponding to control channel candidates in the at least one shortened transmission time interval can be transmitted. The higher layer can be higher than a physical layer. An shortened transmission time interval can be shorter than a subframe-length transmission time interval. At least one resource block of the set of resource blocks at least can partially overlap with a broadcast control channel or signal. Control resource elements used for transmission of a control channel candidate based on the at least one resource block of the set of resource blocks at least partially overlapping in frequency with a broadcast control channel or signal can be determined. The control channel candidate in the at least one shortened transmission time interval according to the determined control resource elements can be transmitted. The control channel candidate can comprise a shortened control channel element spanning a set of shortened resource elements groups in a frequency domain.

FIG. 1 illustrates an example block diagram of a system 100, according to a possible embodiment. The system 100 can include a User Equipment (UE) 110, at least one of network entities 120 and 125, such as a base station, and a network 130. The UE 110 can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The at least one of network entities 120 and 125 can be wireless wide area network base stations, can be NodeBs, can be enhanced NodeBs (eNBs), can be New Radio NodeBs (gNBs), such as 5G NodeBs, can be unlicensed network base stations, can be access points, can be base station controllers, can be network controllers, can be Transmission/Reception Points (TRPs), can be different types of base stations from each other, and/or can be any other network entities that can provide wireless access between a UE and a network. A higher layer message(s) 140 can include various signals transmitted from the network entity 120 and various signals received by the UE 110 described herein.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, the Internet, and/or other communications networks. In a possible embodiment, the network entity 120 and the UE 110 can be included in a cell 135, the network entity 125 can be included in another cell 155, and the network entities 120 and 125 can be coupled via the network 130.

In operation, the UE 110 can communicate with the network 130 via the network entity 120. For example, the UE 110 can send and receive control signals on a control channel and user data signals on a data channel.

In current LTE systems, resources can be assigned using a 1 ms minimum transmission time interval (TTI) when data is available, referred to as dynamic scheduling. Within each scheduled TTI, in UL, a UE 110 can transmit data over a Physical Uplink Shared Channel (PUSCH) in PRB-pairs indicated by an uplink grant to the UE 110 that schedules the data transmission. In DL, the network entity 120 can transmit data over a PDSCH in PRB-pairs indicated by a DL grant/assignment. The UL grant and/or DL assignment information can be provided to the UE 110 in a control channel, referred to as a PDCCH or Enhanced PDCCH (EPDCCH). The (E)PDCCH channel can carry the control information about the data being transmitted on the current subframe and the information about the resources that the UE 110 needs to use for uplink data.

There can be two types of downlink physical layer control signaling for the purpose of dynamic scheduling. One type of downlink physical layer control signaling for the purpose of dynamic scheduling can be PDCCH where the control signaling from the network entity 120 can be received by the UE 110 in the first, first two, or first three, or first four symbols of a subframe subsequently referred to as control symbols. The remaining symbols in the subframe, following the control symbols, can typically be used for receiving user data. User data can be received by the UE 110 on the PDSCH, and in select Resource Blocks (RBs) of the PDSCH occupying either in the entire carrier bandwidth or a portion of it.

The set of PDCCH candidates to monitor are defined in terms of search spaces, where a search space $S_k^{(L)}$ at aggregation level $L \in \{1,2,4,8\}$ can be defined by a set of PDCCH candidates. For each serving cell on which PDCCH can be monitored, the Control Channel Elements (CCEs) corresponding to a PDCCH candidate of the search space $S_k^{(L)}$ can be given by a formula taking parameters including total number of CCEs in the control region of subframe, such as derived from reduction of Physical Control Format Indicator Channel (PCFICH) and Physical channel Hybrid Admission Request (HybridARQ) Indicator Channel (PHICH) resources, an aggregation level, a number of PDCCH candidates to monitor in the given search space, and a slot number within the radio frame.

A physical control channel can be transmitted on an aggregation of one or several consecutive CCEs, where a control channel element can correspond to 9 resource element groups. Each CCE can be equivalent to 36 resource elements (REs). One CCE can be the minimum PDCCH allocation unit.

The number of resource-element groups not assigned to PCFICH or PHICH can be $N_{REG}$. The CCEs available in the system 100 can be numbered from 0 to $N_{CCE}-1$, where $N_{CCE} = \lfloor N_{REG}/9 \rfloor$. A PDCCH can consist of n consecutive CCEs and may only start on a CCE fulfilling i mod n=0, where i can be the CCE number.

Another type of downlink physical layer control signaling for the purpose of dynamic scheduling can be EPDCCH. For each serving cell, higher layer signaling including the higher layer message(s) 140 can configure the UE 110 with one or two EPDCCH-PRB-sets for EPDCCH monitoring. The PRB-pairs corresponding to an EPDCCH-PRB-set can be indicated by higher layers. Each EPDCCH-PRB-set can consist of a set of enhanced control channel elements (ECCEs) numbered from 0 to $N_{ECCE,p,k}-1$ where $N_{ECCE,p,k}$ can be the number of ECCEs in EPDCCH-PRB-set p of subframe k. Each EPDCCH-PRB-set can be configured for either localized EPDCCH transmission or distributed EPDCCH transmission.

For each serving cell, the subframes in which the UE 110 monitors EPDCCH UE-specific search spaces can be configured by higher layers. The UE 110 can monitor a set of (E)PDCCH candidates for control information, where monitoring can imply attempting to decode each of the (E)PDCCH decoding candidates in the set according to the monitored Downlink Control Information (DCI) formats. The set of (E)PDCCH candidates to monitor can be defined in terms of (E)PDCCH search spaces.

To reduce latency of communication in LTE, various solutions are being studied. For example, an approach envisioned for future LTE systems can include use of a shorter minimum TTI, such as shorter than 1 ms, in UL/DL. Using a sTTI, such as a minimum sTTI, can allow the UE 110 to send/receive data using reduced latency when compared to current LTE systems. In addition, acknowledging each (or a group containing few) sTTI(s) leading to faster, as compared to using 1 ms TTI, acknowledging data can help in some applications, such as Transmission Control Protocol (TCP), during slow-start phase for users in good channel conditions. For example, in the TCP slow-start phase for DL communication, the network 130-UE 110 link capacity for the UE 110 in good channel condition can support more data, but the network 130 sends a smaller amount of data because the network 130 can be waiting to receive the acknowledgment for the previously sent data due to the TCP slow-start phase. Therefore, faster acknowledgments, such as a result of using shorter TTI length, can enable the network 130 to better utilize the available network 130-UE 110 link capacity.

The currently supported sTTI configurations within a subframe can be either (A) a combination of 6 sTTIs each composed of two or three, such as OFDM symbols in DL or SC-FDMA symbols in UL, symbols or (B) two 0.5 ms-length sTTIs. For example, scheduling UE 110 transmission over an sTTI length of 0.5 ms, such as PUSCH scheduled using a PRB spanning a 0.5 ms in a 1 ms subframe, or scheduling UE 110 transmission over an sTTI length of ~140 us, such as PUSCH scheduled using a shortened PRB spanning two SC-FDMA symbols within a slot in a subframe, would not only reduce time taken to start/finish transmitting a data packet, but also potentially reduce round trip time for possible Hybrid Automatic Repeat Request (HARD) retransmissions related to that data packet.

The PDCCH channel can carry control information about data being transmitted on a current subframe and information about resources which the UE 110 needs to use for the uplink data. The UE 110 can decode it if it wants to send some data or receive something. For reduced latency a shortened Physical Downlink Control Channel (sPDCCH) can be defined to play a similar role in an sTTI, or a group of sTTIs. For PDCCH, allocation of resources can happen in terms of CCEs which can be equivalent to 36 REs. One CCE can be the minimum PDCCH allocation unit.

As the sTTI length can become smaller, control overhead can increase, which in turn can increase complexity and hence processing delay, and can could negatively impact latency reduction offered by a low-latency operation. To reduce the control signal overhead, scheduling multiple sTTIs via a single grant can be performed, such as sent via an sPDCCH or (E)PDCCH command, which can be referred to as multi-sTTI scheduling. In another embodiment to reduce the control signal overhead, sending the control information in a hierarchical manner can be performed, such as more than one step. For instance, a first step can provide a subset of control information common to a set of sTTIs at a first time instant, and a second step can provide complementary control information pertinent to each sTTI at a second time instant. Yet another approach can include sending the control information in each scheduled sTTI, but with some DCI bit field reduction compared to the DCIs used for legacy 1 ms-TTI. For instance, for a 2/3-symbol sTTI, the Resource Block Group (RBG) size, which for sTTI can be referred to as shortened RBG (sRBG), can be larger, for example 2-6 times, than that used by legacy 1 ms-TTI.

Figure 2:
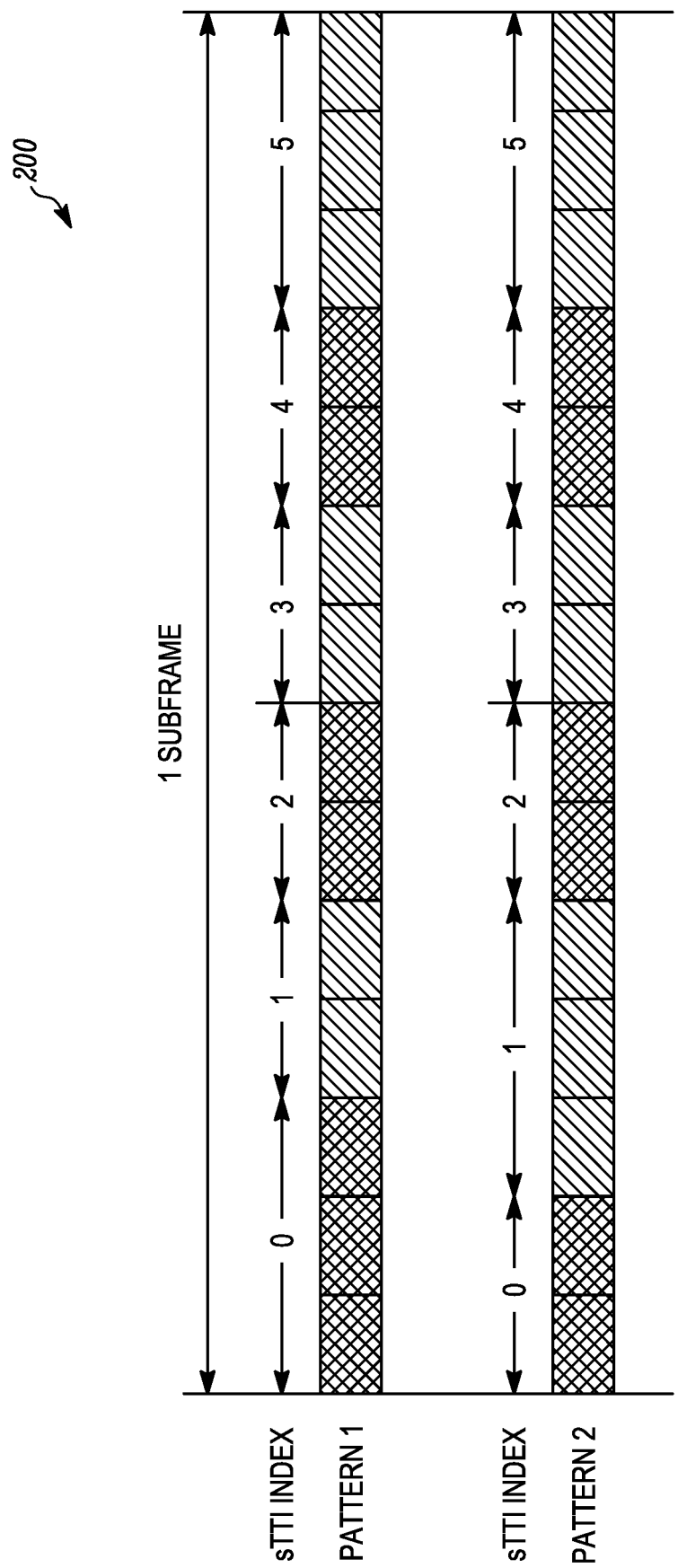
FIG. 2 illustrates example agreed Downlink (DL) short Transmit Time Interval (sTTI) patterns, according to a possible embodiment.

FIG. 2 illustrates example agreed DL sTTI patterns 200. According to possible 3GPP agreements, for 2-symbol DL TTI, the sTTI patterns 200 show OFDM symbols per subframe that can be supported for a 2/3 OFDM symbol-sTTI configuration. For a Control Channel (CC) configured with a 2-symbol sTTI operation, for a cross-carrier scheduled CC, the starting symbol index of the first potential shortened PDSCH (sPDSCH) can be configured by Radio Resource Control (RRC). For a self-carrier scheduled CC, the starting symbol index of the first potential sPDSCH can be equal to Control Format Indicator (CFI) value indicated by PCFICH.

The UE 110 can determine the sTTI pattern in accordance with Table 1.

TABLE 1

| The starting symbol index of the first potential sPDSCH | 2-symbols DL sTTI pattern |
| --- | --- |
| 1,3 | 1 |
| 2 | 2 |

Figure 3:
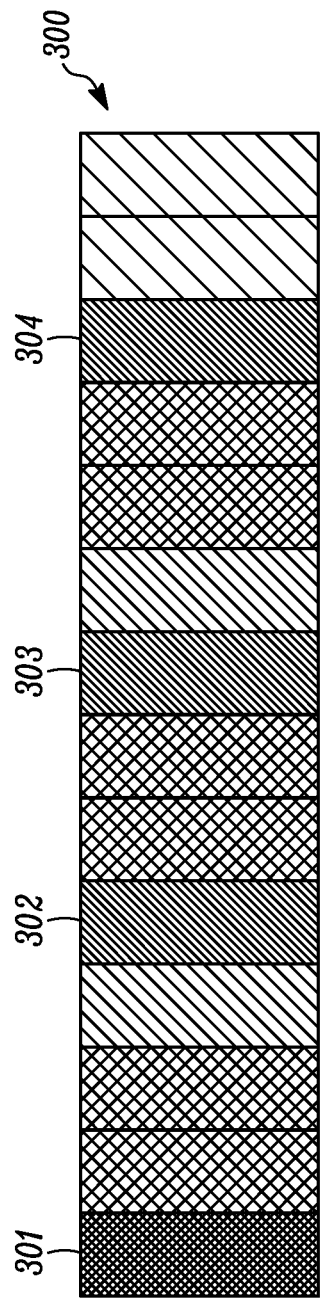
FIG. 3 illustrates an example sTTI DL pattern, according to a possible embodiment.
Figure 4:
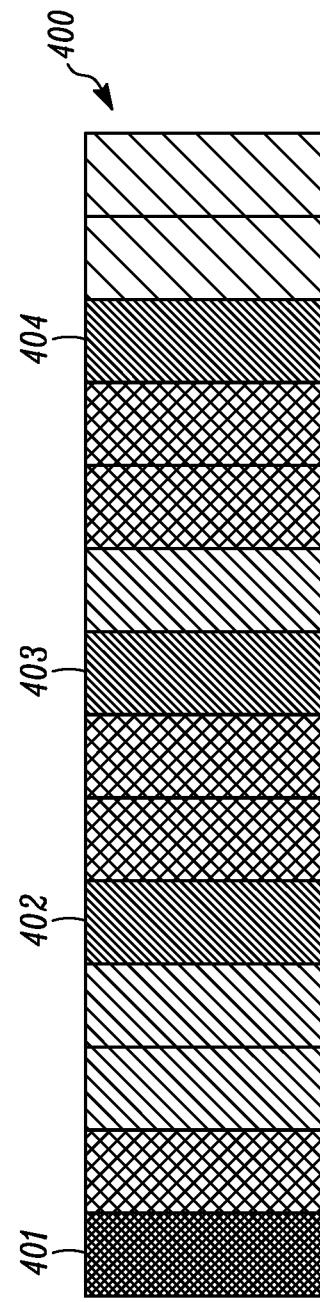
FIG. 4 illustrates another example sTTI DL pattern, according to a possible embodiment.

FIG. 3 illustrates an example sTTI DL pattern 300. FIG. 4 illustrates another example sTTI DL pattern 400. A CRS, as shown in Table 1, can be for each of the two example sTTI DL patterns 300 and 400, illustrated in FIGS. 3 and 4, respectively. The DL sTTI patterns illustrated assume two port CRS, shown as CRS symbols being shown in FIGS. 3 and 4 as CRS symbols 301-304 and 401-404, respectively. sPDCCH design principles that have been adopted by 3GPP include both CRS-based and DMRS-based sPDCCH can be supported. Radio Access Network layer 1 (RAN1) will not pursue Code Division Multiplexing in Frequency direction (CDM-F) based DMRS pattern for sPDCCH. Legacy PDCCH can be used to transmit shortened DCI (sDCI), such as DCI for sPDSCH and/or shortened PUSCH (sPUSCH). Quadrature Phase Shift Keying (QPSK) can be used for sPDCCH. Tail biting convolutional coding can be used for sPDCCH. For CRS-based sPDCCH, in time domain sPDCCH can be transmitted from the first OFDM symbol within an sTTI and sPDCCH without mapped to the PDCCH region, and frequency resource for sPDCCH can be informed by the network entity 120.

Different sPDCCH principles can be used. One or two RB set(s) can be configured by the higher layer message(s) 140 within the higher layer signaling for sPDCCH frequency resource of the UE 110, with any number of RBs per set being possibly used. A shortened Resource Element Group (sREG) can consists of 1 RB within 1 OFDM symbol including REs for CRS and/or DMRS applied to DMRS based sPDCCH. An sREG can consist of 1 RB within 1 OFDM symbol including REs for CRS and/or DMRS applied to DMRS based sPDCCH. For sTTI, an sREG can equal 1 RB over 1 OFDM symbol including REs for CRS and/or DMRS applied to CRS based sPDCCH. A CRS based sPDCCH RB set can be configured to the UE 110 by higher-layer signaling either with distributed or localized mapping of a shortened CCE (sCCE) to sREG. The UE 110 can be configured to monitor sPDCCH RB set(s), such as at most two sPDCCH RB set(s) containing the sTTI User Security Setting (USS) in an sTTI, where one sPDCCH candidate can be contained within one RB set. The UE 110 can be configured to monitor at most two sPDCCH RB set(s) containing the sTTI User Security Setting (USS) in an sTTI, where one sPDCCH candidate can be contained within one RB set. The number of OFDM symbols per RB set can be for CRS based sPDCCH, for 2/3-symbol sTTI, such as 1 or 2 that can be configured by higher layer. The number of OFDM symbols per RB set for CRS-based sPDCCH can be 1, 2, and possible 3 symbols for 1-slot sTTI and can be configured by higher layer. The number of OFDM symbols per RB set can be for DMRS based sPDCCH, for 2/3-symbol sTTI, such as 2 for 2-symbol sTTI #1,2,3,4, 3 for 3-symbol sTTI #1 and #5, sTTI #0, and/or for 1-slot sTTI: 2, and for 1-slot sTTI: 2. Space-Frequency Block Coding (SFBC) can be supported for CRS-based sPDCCH, with any number of antenna ports being possibly used. Single port DMRS-based sPDCCH demodulation can be supported, with any size bundling size being possibly used. In an example, two port DMRS-based sPDCCH demodulation can be used, including bundling size.

A sPDCCH RB set can be configured with at least a set of RBs, where an EPDCCH PRB allocation can be reused, transmission scheme, such as CRS-based or DMRS-based can be used, localized or distributed sCCE to sREG mapping can be used, such as at least for CRS, and, if supported DMRS-based sPDCCH can be used, with localized or distributed sPDCCH candidate to sCCE mapping being possible, a number of sPDCCH candidates/aggregation levels of the RB set can be used, where same or different sPDCCH candidates for different sTTI indexes being possible, a number of symbols for sPDCCH duration at least in case of CRS-based transmission can be used, a Reference Signal (RS) scrambling sequence can be used, such as Virtual Cell Identities (VCID) in case of DMRS-based transmission, and other information if needed.

The sPRG size for 2/3os sPDSCH can be N, such as sPRG of N RBs, where N can be the same for all system BW or can be system BW specific and N can be down-selected from [2, 3, 4 and 6]. For up to 2 layers sPDSCH in one sTTI, each layer can map to one different DL DMRS port, and each DMRS port can have Orthogonal Cover Code (OCC)-2 in time domain to support code division multiplexing. The DL DMRS pattern can be fixed for 2-layer 2/3-symbol sPDSCH, with down-selection can be used between 3 options: option 1: X=3, N=1, option 2: X=2, N=1, and option 3: N>1, X=2N+1 or X=2N. N can be the number of RBs and X can be subcarriers per N RB(s). DL DMRS can be shared among 2 consecutive sTTIs for the same UE 110 for 2/3-symbol sPDSCH, without sharing across subframes being supported, sharing across slots can be used, and 3 consecutive sTTIs can be used. DL DMRS RE shift in frequency domain can be supported when colliding with CRS RE.

The number of required RBs for sPDCCH assuming an example sCCE size of 36, and different sPDCCH AL and symbol length that can exist is shown in Table 2 further illustrates 2. Table 2 further illustrates a number of required RBs for sPDCCH for different ALs and number of sPDCCH symbols assuming an example 36 REs for sCCE that can exist, such as when sCCE can be similar to CCE used for sTTI operation.

TABLE 2

| # of sPDCCH symbols | CRS present in one of sPDCCH symbol(s) | CCE size in REs | AL | # RBs |
|---|---|---|---|---|
| 1 | no | 36 | 1 | 3 |
| 1 | no | 36 | 2 | 6 |
| 1 | no | 36 | 3 | 9 |
| 1 | no | 36 | 4 | 12 |
| 1 | no | 36 | 6 | 18 |
| 1 | no | 36 | 8 | 24 |
| 2 | no | 36 | 2 | 3 |
| 2 | no | 36 | 4 | 6 |
| 2 | no | 36 | 6 | 9 |
| 2 | no | 36 | 8 | 12 |

Similarly, for an example CCE size of 48, shown in Table 3 illustrates the required number of RB that can exist. Table 3 illustrates a number of RBs that can be taken for sPDCCH for different ALs and number of sPDCCH symbols assuming an example forty-eight (48) REs for sCCE.

TABLE 3

| # of sPDCCH symbols | CRS present in one of sPDCCH symbol(s) | CCE size in REs | AL | # RBs |
|---|---|---|---|---|
| 1 | no | 48 | 1 | 4 |
| 1 | no | 48 | 2 | 8 |
| 1 | no | 48 | 3 | 12 |
| 1 | no | 48 | 4 | 16 |
| 1 | no | 48 | 6 | 24 |
| 1 | no | 48 | 8 | 32 |
| 2 | no | 48 | 2 | 4 |
| 2 | no | 48 | 4 | 8 |
| 2 | no | 48 | 6 | 12 |
| 2 | no | 48 | 8 | 16 |

For control channel design for LTE sPDCCH, the embodiments provide solutions for determining by the UE 110 the number of sREGs per sCCE by the UE 110, the time-frequency position of the sREGs within the time and frequency resources available for control reception, and the control carrying time-frequency resources within sREGs of the control.

Due to varying number of overhead, such as due to presence of CRS in an sTTI and/or DMRS, in control resources, having a fixed number of sREGs per sCCE could lead to a variable number of REs available for control transmission. In a possible embodiment, the number of sREGs per sCCE can be fixed, such as 3 sREGs or 4 sREGs. Imposing certain scheduling restrictions can make it possible to have the number of REs available for control transmission be larger than a certain threshold. Examples of these restrictions can include not allowing DMRS-based sPDCCH in sTTIs including CRS, or sTTIs wherein the control symbols overlap with a CRS containing symbol. In a possible embodiment, the UE 110 can be excluded from performing, such as shall not or based on a configuration sent by network entity 120, monitor DMRS-based sPDCCH when four antenna port CRS is applied. In a possible embodiment, the UE 110 can be excluded from monitoring DMRS-based sPDCCH in sTTI 3, such as in an sTTI where two control symbols overlap with two CRS containing symbols, when four antenna port CRS is applied. The network 130 can configure the UE 110 on whether DMRS-based sPDCCH is possible to occur in sTTIs including CRS or sTTIs wherein the control symbols for DMRS-based sPDCCH overlap with a CRS containing symbol, and accordingly, the UE 110 can monitor DMRS-based sPDCCH in those sTTIs if it is configured to do so.

The DMRS-based sPDCCH can happen in sTTI "n" including CRS, or sTTIs wherein the control symbols overlap for DMRS-based sPDCCH with a CRS containing symbol, only when the DMRS is shared between sTTI "n−1" and sTTI "n" and present in sTTI "n−1". In an example, the UE 110 can assume no DMRS is transmitted for sPDCCH candidates in sTTI n and can use the DMRS REs from sTTI n−1 for demodulation of sPDCCH candidates in sTTI n. sPDCCH candidate RE mapping in sTTI n can be such that there is no rate-matching around DMRS REs. In an example, the UE 110 can use the same subcarriers for DMRS in sTTI n−1 for attempting to decode sPDCCH in sTTI n as would be the case if DMRS was transmitted on sTTI n. In a possible embodiment, the UE 110 can be excluded from monitoring DMRS-based sPDCCH in sTTI 3, such as in an sTTI where two control symbols overlap with two CRS containing symbols, when four antenna port CRS can be applied. In a possible example, the UE 110 can assume no DMRS is transmitted for sPDCCH candidates in sTTI n and can use the DMRS REs from sTTI n−1 for demodulation of sPDCCH candidates in sTTI n. In an example, the UE 110 can use the DMRS from sTTI n−1 that at least overlap in frequency with the sREGs associated with the sPDCCH in sTTI n. In case of PRB bundling, DMRS REs in the bundled PRBs in sTTI n−1 that have at least one PRB of the bundled PRB overlapping in frequency with the sREGs associated with the sPDCCH in sTTI n can be used for demodulating and decoding the sPDCCH in sTTI n. If the UE 110 is configured to monitor DMRS-based sPDCCH, the UE 110 can monitor the DMRS-based sPDCCH in an sTTI containing CRS, or sTTIs wherein the control symbols overlap with a CRS containing symbol, assuming DMRS is shared between the previous sTTI and the current sTTI. In such a case, the Aggregation Level (AL) or location of the control can be different between the sTTIs sharing the DMRS, but the control resources of the second sTTI can fully overlap with control and data resources of the first sTTI containing the DMRS.

In an embodiment, the UE 110 can determine the number of sREGs per sCCE based on some parameters, or their combinations. For example, for sRBG size CRS based sPDCCH, for at least localized sREG to sCCE mapping, can be configured with 1 OFDM symbol length. From a multiplexing perspective, multiplexing data and control or multiplexing two control, an integer number of sCCEs can fit in an sRBG.

Figure 7:
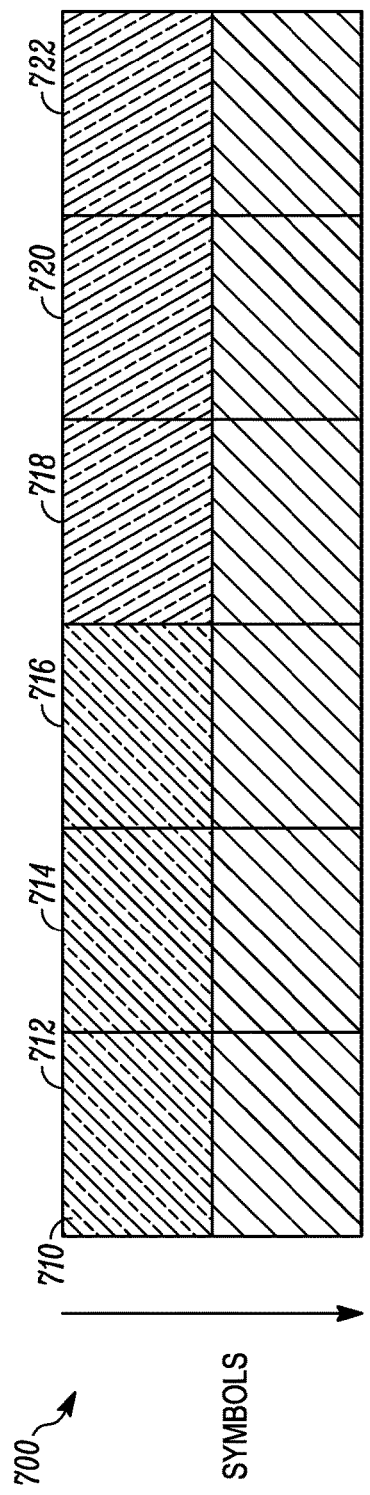
FIG. 7 illustrates yet another example sRBG, according to a possible embodiment.

FIGS. 5-7 are example illustrations 500, 600, and 700 showing example sRBGs according to a possible embodiment. For instance, as shown in the illustration 700, two sCCEs each with 3 sREGs can fit in an sRBG size of 6 RBs 710, 712, 714, 716, 718, 720, and 722, whereas as illustrated in sRBG of the illustration 500, only 1 sCCE with 4 sREGs 510, 512, 514, and 516 can completely fit in the sRBG. With 4 REGs per sCCE as illustrated in illustrations 500 and 600, to multiplex an UL grant with 1 sCCE, and a DL assignment with 1 sCCE, 2 sRBGs can be needed, and reusing the unused resources in the second sRBG for DL data transmission can become complex if not impossible. In the example shown in illustrations 500 and 600, to at least better use the resources in the second symbol of $1^{st}$ RBG for DL data transmission, such as those assigned by sCCEs 610, 612, 614, and 616, the network entity 120 can configure the UE 110 associated with sCCE 510, 512, 514, and 516 to rate-match around the DMRS in the first symbol. In other words, the network entity 120 can send DMRS for another UE in RBs 510, 512, 514, and 516 in the illustration 500. In another embodiment, the network entity 120 can transmit DMRS for DL data for the same UE 110, such as if sCCE 510, 512, 514, and 516 was a DL assignment in in the $1^{st}$ sRBG, although the DL assignment can be a CRS-based sPDCCH. In that case, if configured, the UE 110 can rate match around the DMRS in the first symbol to decode the control. In illustrations 500 and 600, a sCCE can contain 4 sREGs 510, 512, 514, and 516 in the first sRBG and 4 sREGs 610, 612, 614, and 616 in the $2^{nd}$ sRBG, in an sRBG of 6 RBs, whereas in FIG. 7, 2 CCEs, one illustrated in RBs 710, 712, and 714 and a second illustrated in RBs 718, 720, an 722, each can be composed of 3 sREGs. Each sREG can be composed of 1 RB. Assuming sCCE, such as RBs 510, 512, 514, and 516 are for UL grant and RBs 610, 612, 614, and 616 are for DL assignment, reusing the RBs in the $1^{st}$ symbol of the $1^{st}$ sRBG for DL data transmission in FIGS. 5 and 6 can be difficult.

In an example embodiment, for 2-symbol CRS-based sPDCCH with DMRS-based sPDSCH, using 4 sREGs per sCCE can ease design. However, it can lead to significant control overhead, especially for larger ALs. To overcome such a deficiency, for AL=1, or odd ALs 4 sREGs can be used. For other even ALs, 3 sREGs/sCCE can be used, but can have even number of sCCEs within a sRBG. In an example embodiment, a hybrid scheme of elements of solutions as to those previously discussed can be possible, wherein the number of sREGs per sCCE can be selected from a limited set but certain scheduling restrictions similar to those explained can ensure the number of available REs for control can be above a required minimum.

Figure 8:
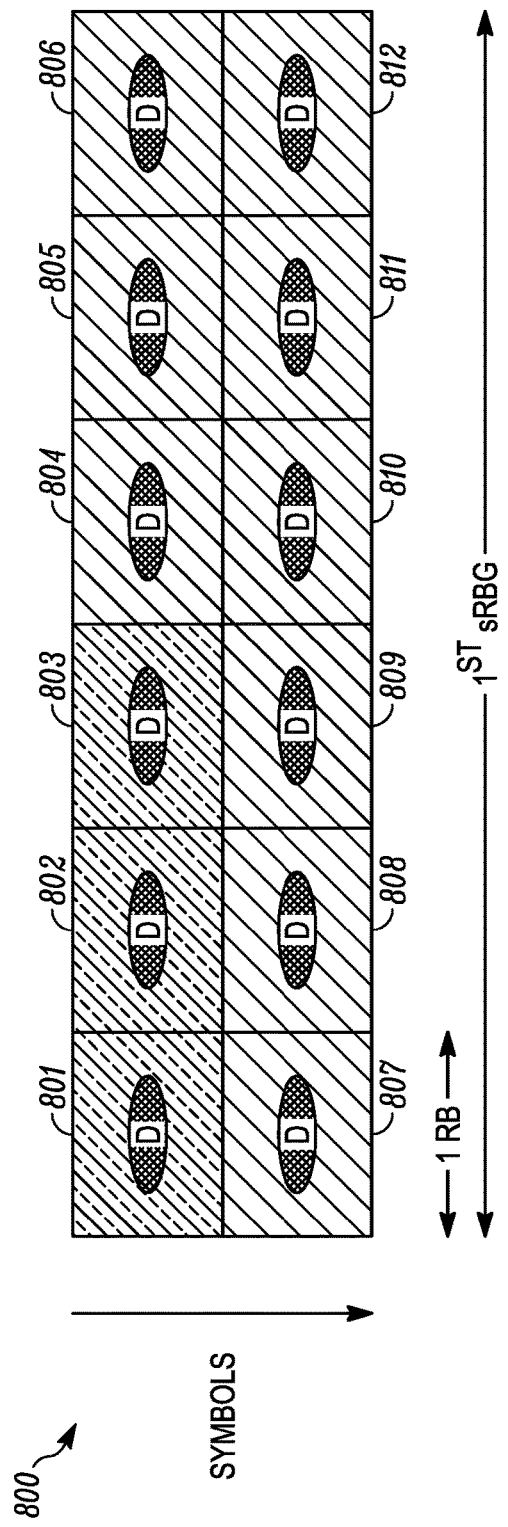
FIG. 8 illustrates an example illustration of 1-symbol length Cell-specific Reference Signals (CRS)-based short Physical Downlink Control Channel (sPDCCH), according to a possible embodiment.

FIG. 8 illustrates an example illustration 800 of 1-symbol length CRS-based sPDCCH. Network entity 120 can configure the UE 110 to rate-match around the data DMRS present in the control resources when monitoring the control candidates. In a 1-symbol CRS-based sPDCCH, the UE 110 can determine control resources in sREGs in the $1^{st}$ RBs 801-803 of the $1^{st}$ symbol by assuming rate matching around DL data DMRS REs. Data RBs are illustrated in remaining blocks 804-812 of CRS-based sPDCCH 800, with "D" representing DL data DMRS. The DMRSs are symbolically illustrated and the DMRSs may or may not occupy the center resources of a given RB.

In another embodiment, the UE 110 can determine whether to rate-match around DMRS for control monitoring based on at least whether DMRS-based sPDSCH is configured. For example, this can be useful for 1-symbol CRS-based sPDCCH with both localized and distributed sREG to sCCE mappings. If DMRS was shared between two consecutive sTTIs, such as sTTI "n−1" and sTTI "n", the UE 100 can assume DMRS positions are punctured in the control region in sTTI "n", assuming DMRS presence in sTTI "n−1", since the UE 110 does not know before decoding the sPDCCH in sTTI "n" if the DMRS was shared across sTTI "n−1", and "n". In a possible embodiment, the UE 110 can know from sTTI "n−1" that the UE 110 can decode sPDCCH assuming no DMRS is present in sTTI n for DMRS based sPDCCH. In another embodiment, if the UE 110 is configured to rate-match around DMRS for sPDCCH, such as CRS-based sPDCCH, the UE 110 can rate-match around the DMRS. The UE 110 can assume a non-UE specific precoder can be used/associated with the DMRS in control resources in sTTI n−1. sPDCCH in sTTI "n" can use the DMRS REs from sTTI "n−1" on the RBs corresponding to the sPDCCH. The Antenna Port (AP) for the sPDCCH can be based on the candidate that can be monitored in sTTI "n". In 3-symbol sTTI, the last two symbols of the sTTI can have DL data DMRS, and the control containing symbol, such as the $1^{st}$ symbol of the sTTI, can be decoded assuming no DMRS present. If DMRS-based sPDSCH is used in the next two symbols of the 3-symbol sTTI, DMRS distribution pattern in the next two symbols can be determined based on the location of the sREGs in the first symbol.

Figure 9:
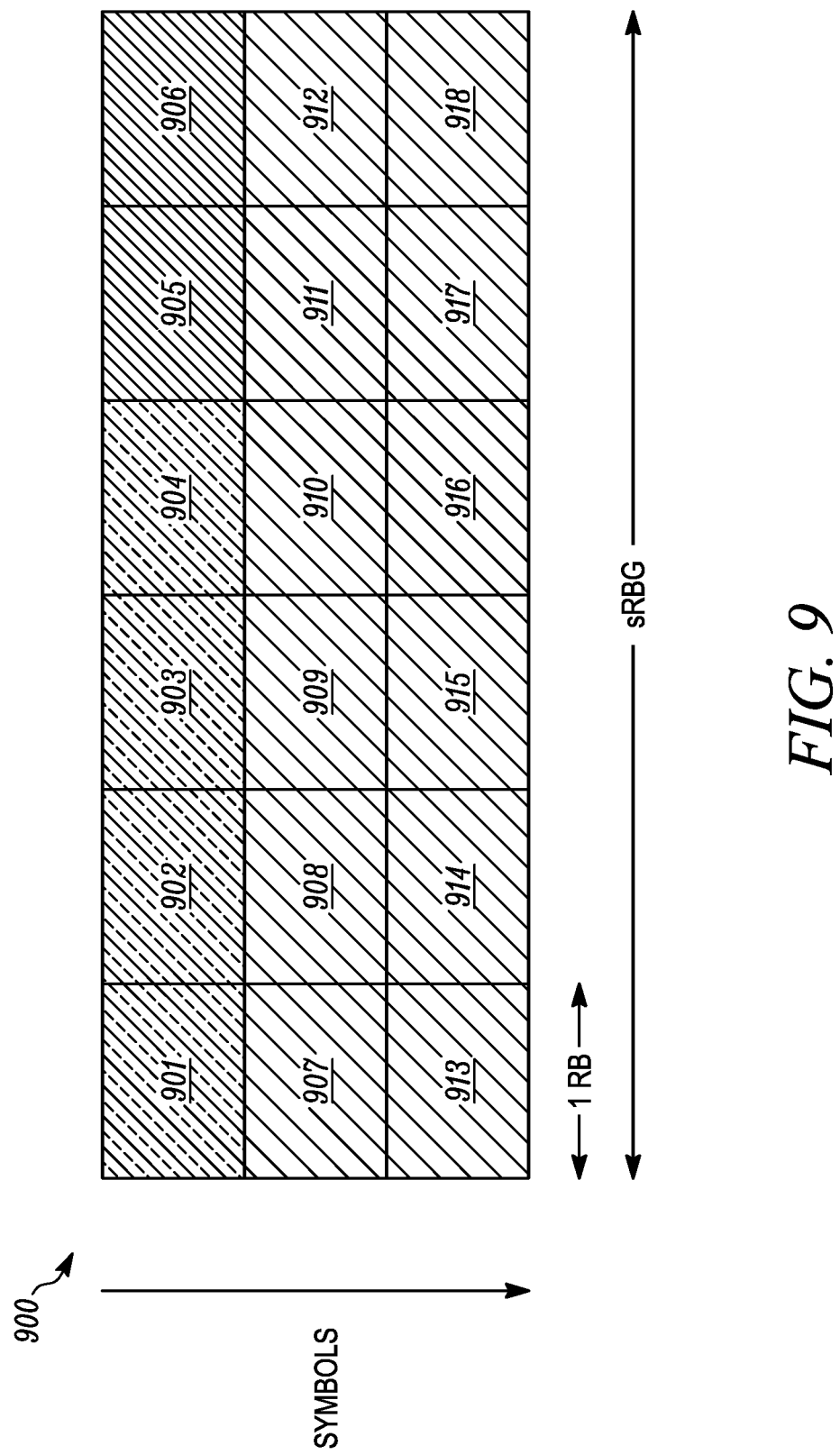
FIG. 9 illustrates an example 3-symbol sTTI, according to a possible embodiment.

FIG. 9 illustrates an example 3-symbol sTTI 900, such as sTTI 5 in FIG. 2. The DMRS pattern for sPDSCH can be determined based on the location of the sREGs in the $1^{st}$ symbol, as show in the first four RBs 901-904 of the $1^{st}$ symbol, with the remaining RBs 905-918 not including REGs. The 3-symbol sTTI 900 includes a bundling size=3 RBs, and X=2N+1, with 7 DMRS per 3 RBs.

If bundling size or DMRS distribution pattern can be different for sPDSCH and DMRS-based sPDCCH, they can share DMRS within an sRBG. In a possible embodiment, an sPDSCH bundling pattern can take precedence. In another embodiment, both sPDCCH and sPDSCH bundling patterns can be aligned. For 3GPP agreements, in a possible embodiment a single port DMRS-based sPDCCH demodulation can be supported. In another embodiment, two port DMRS-based sPDCCH demodulation can be supported.

Figure 10:
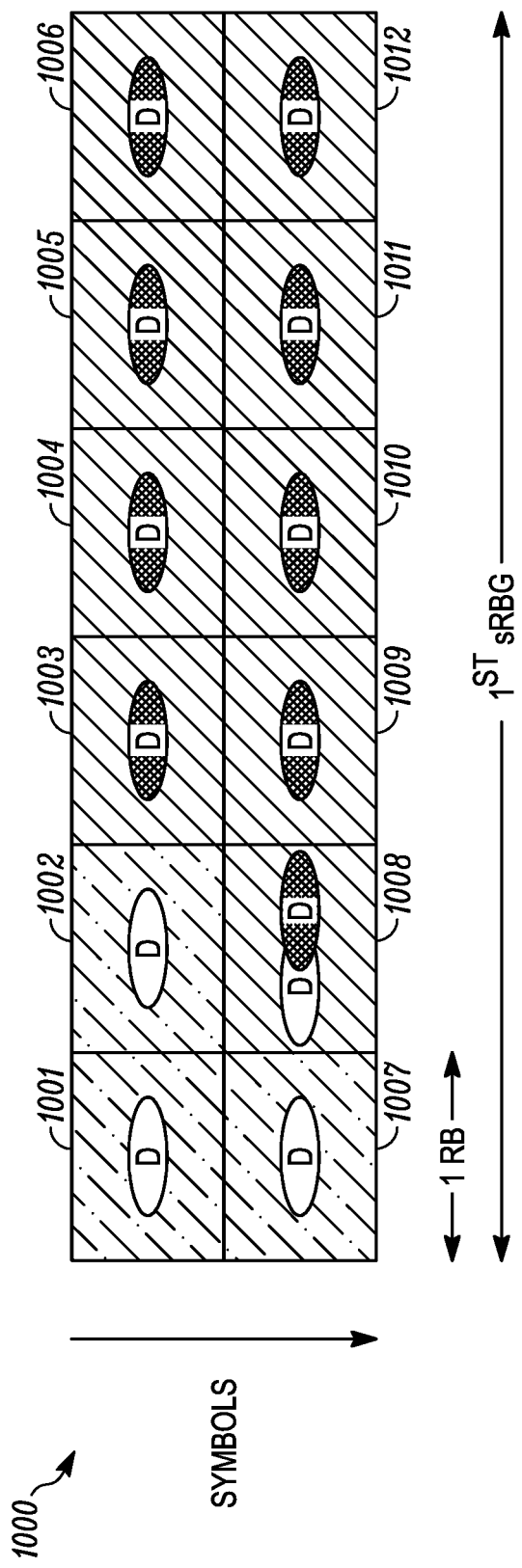
FIG. 10 illustrates an example illustration showing a Demodulation Reference Signal (DMRS) sharing example between DMRS-based sPDCCH and short Physical Downlink Shared Channel (sPDSCH), according to a possible embodiment.
Figure 11:
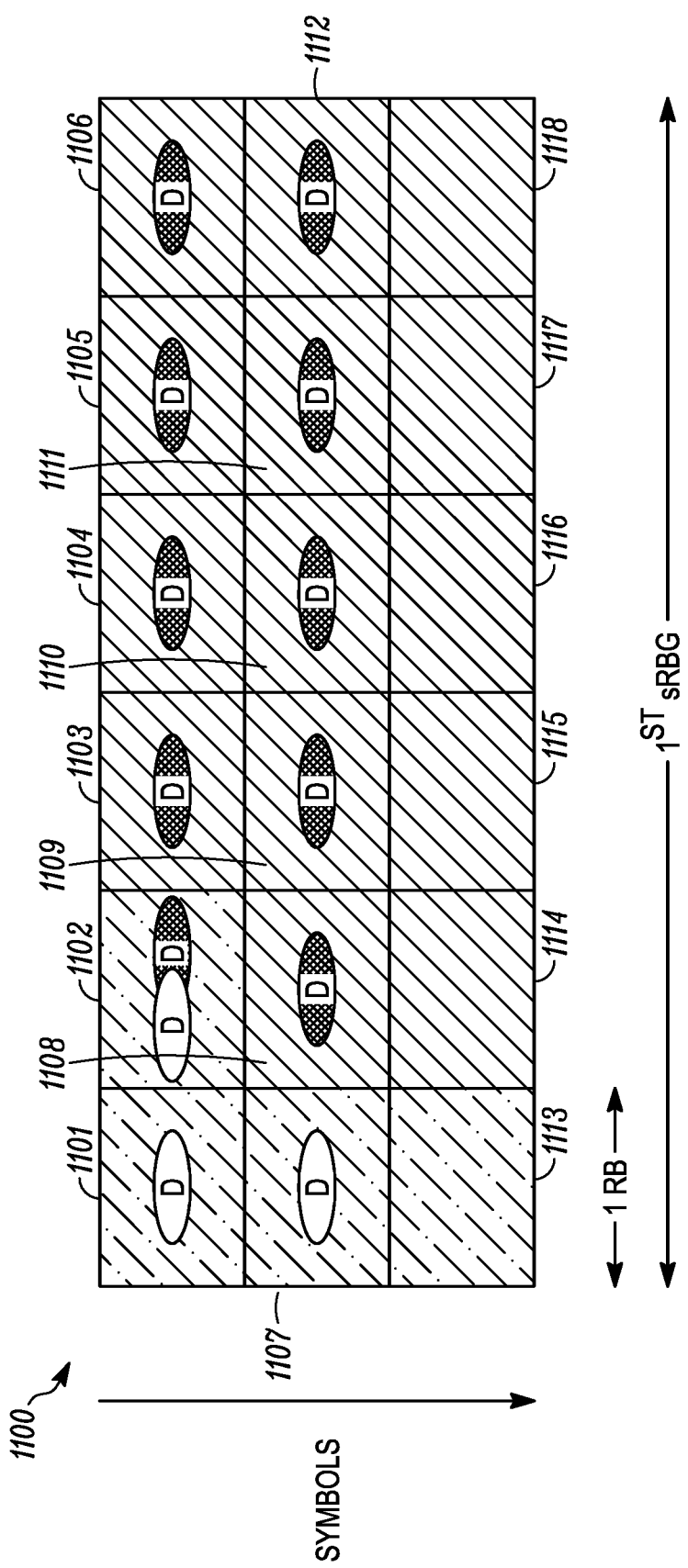
FIG. 11 illustrates another DMRS sharing example between DMRS-based sPDCCH and sPDSCH, according to a possible embodiment.

FIG. 10 is an example illustration 1000 showing a DMRS sharing example between DMRS-based sPDCCH and sPDSCH. FIG. 11 is an example illustration 1100 showing another DMRS sharing example between DMRS-based sPDCCH and sPDSCH. For example, 3 sREGs can be used per sCCE in a 2-symbol sTTI, such as with 2-symbol sPDSCH, such as shown in the sREGs 1001 and 1002 of the $1^{st}$ symbol and the sREG 1007 of the $2^{nd}$ symbol in the illustration 1000, or 4 sREGs can be used per sCCE in a 3-symbol sTTI with 3-symbol sPDCCH, such as shown in the first two sREGs 1101 and 1102 of the $1^{st}$ symbol, the $1^{st}$ sREG 1107 of the $2^{nd}$ symbol, and the $1^{st}$ sREG 1113 of the $3^{rd}$ symbol, of the $1^{st}$ sRBG 1020 shown in FIG. 11. The data part including sREGs 1103-1106, 1108-1112, and 1114-1118 of the 3-symbol sTTI in the illustration 1100 or the data part including sREGs 1003-1006 and 1008-1012 of the 2-symbol sTTI in the illustration 1000 can contain DMRS resources in an RB not belonging to the control part including sREGs 1101, 1102, 1107, and 1113 of the 3-symbol sTTI in the illustration 1100 or the control part including sREGs 1001, 1002, and 1007 of the 2-symbol sTTI in the illustration 1000, respectively. The UE 110 can determine the DMRS pattern within the RB(s) where DMRS can be shared between the data and control, such as in sREGs 1008 in the illustration 1000 and 1102 in the illustration 1100, such as based on the DMRS pattern for data, based on the DMRS pattern for control, and/or based on both.

Figure 12:
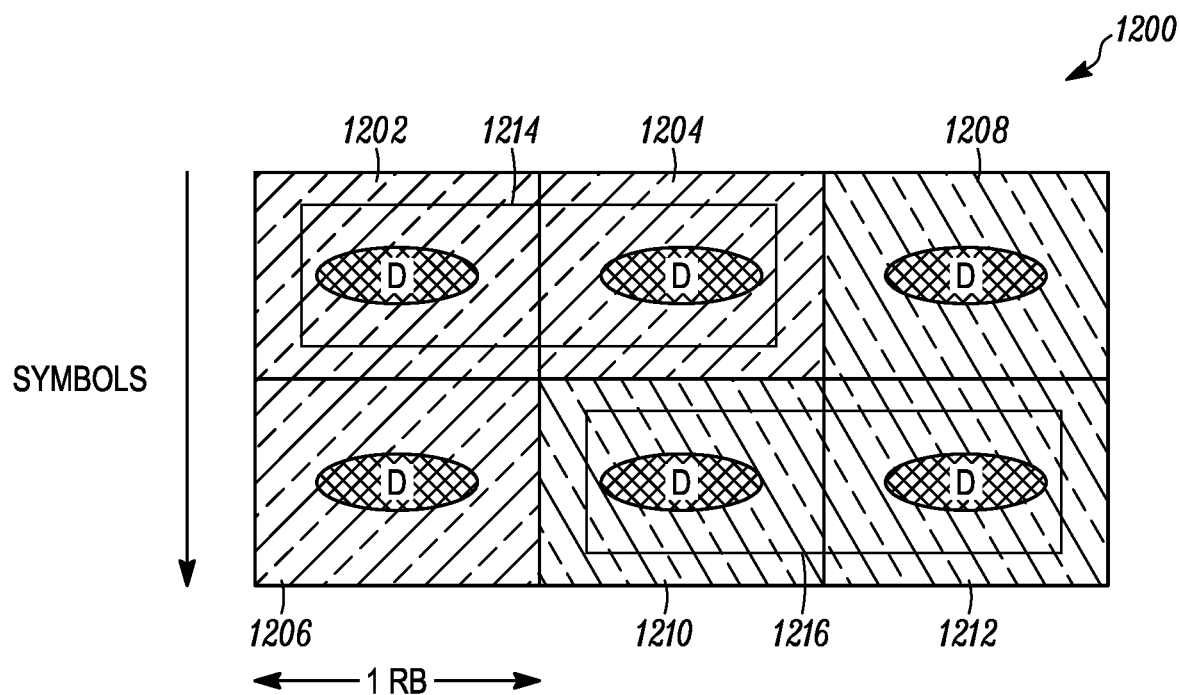
FIG. 12 illustrates an example sCCE structure, according to a possible embodiment.

FIG. 12 illustrates an example sCCE structure 1200 for DMRS-based sPDCCH with 3 sREGs per sCCE. The RBs, such as the control RBs, that constitute an RB bundle can be different for different CCE indexes. For example, sCCE 0 can use the $1^{st}$ AP and sCCE 1 can use the $2^{nd}$ AP. AP can be based on Radio Network Temporary Identifier (RNTI) for the UE 110 and/or the sCCE index, such as lowest sCCE index forming the sPDCCH candidate. For example, assuming 3 sREGs, each composed of 1 RB, per sCCE, the example sCCE structure 1200 can be possible in a 2-symbol sTTI for a DMRS-based sPDCCH. The illustrated "D" can represent a DMRS. The RBs in sREGs corresponding to the $1^{st}$ sCCE and the $2^{nd}$ sCCE are shown in RBs 1202, 1204, and 1206, and 1208, 1210, and 1212, respectively. The first and second RB bundles are shown by rectangle 1214, and rectangle 1216, respectively. The RB bundling example shown in FIG. 12 can be for AL=1 candidates, such as when control contains only 1 sCCE. In another embodiment, higher ALs, such as AL=2, can have a different RB bundling size than that shown in FIG. 12.

Figure 13:
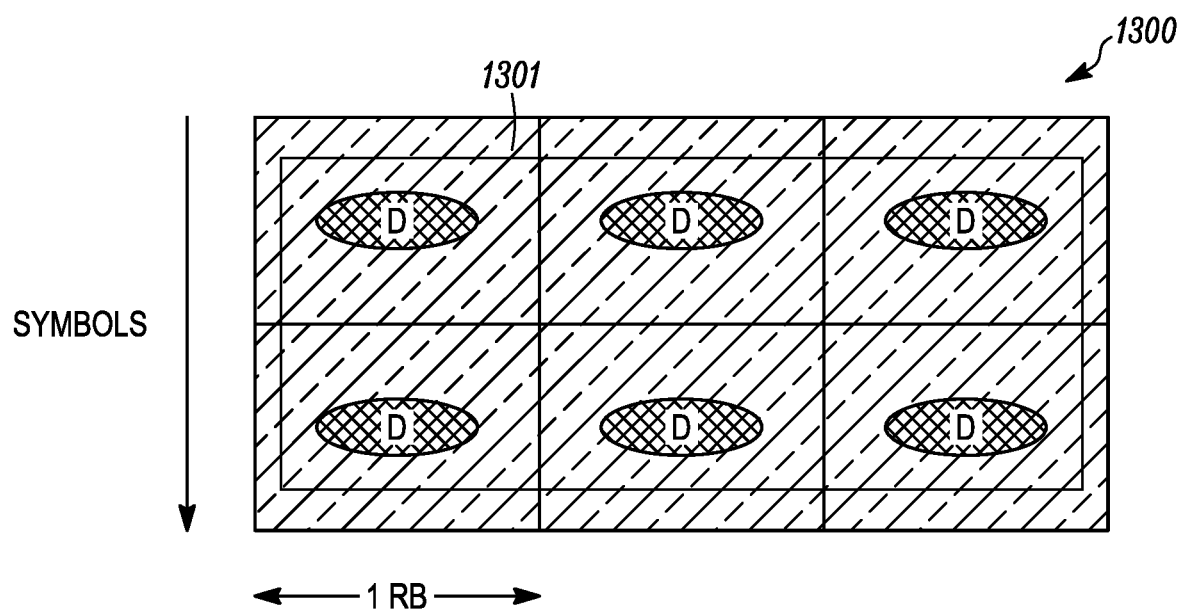
FIG. 13 illustrates another example sCCE structure, according to a possible embodiment.

FIG. 13 illustrates another example sCCE structure 1300. In a possible embodiment, the example sCCE structure 1300 can be for a DMRS-based sPDCCH with 3 sREGs per sCCE such as 1301, and higher ALs, such as AL=2, can have a different RB bundling size and can be composed of two sCCEs. "D" represents DMRS. The RB bundle size in frequency can be 3.

The UE 110 can determine the location of the 1-symbol sPDCCH within an sTTI of 2/3 symbol, or a 2-symbol sPDCCH within 3-symbol sTTI based on one or more of the length of the configured sPDCCH, sTTI index, and the overhead, such as reference symbol overhead. Such an approach can be helpful in avoiding the CRS overhead to reduce the number of available REs in an RB used for control resources, such as in an sREG. For example, an sPDCCH with 2-symbol length can start from the first symbol in sTTI 1, such as in DL sTTI pattern 2 300 and 400 shown in FIGS. 3 and 4, while for sTTI 5, a 2-symbol sPDCCH can start from the $2^{nd}$ symbol of the sTTI.

PBCH in LTE can carry essential information referred to as a Master Information Block (MIB). PBCH can transmitted over 6 RBs (72 subcarriers) centered around a Direct Current (DC) subcarrier in the first 4 OFDM symbols of the $2^{nd}$ of sub frame 0 of a radio frame, each radio frame for LTE can be 10 ms and each slot is 5 ms. The DC subcarrier can be the subcarrier whose frequency can be equal to the RF center frequency of the transmitting station.

Figure 14:
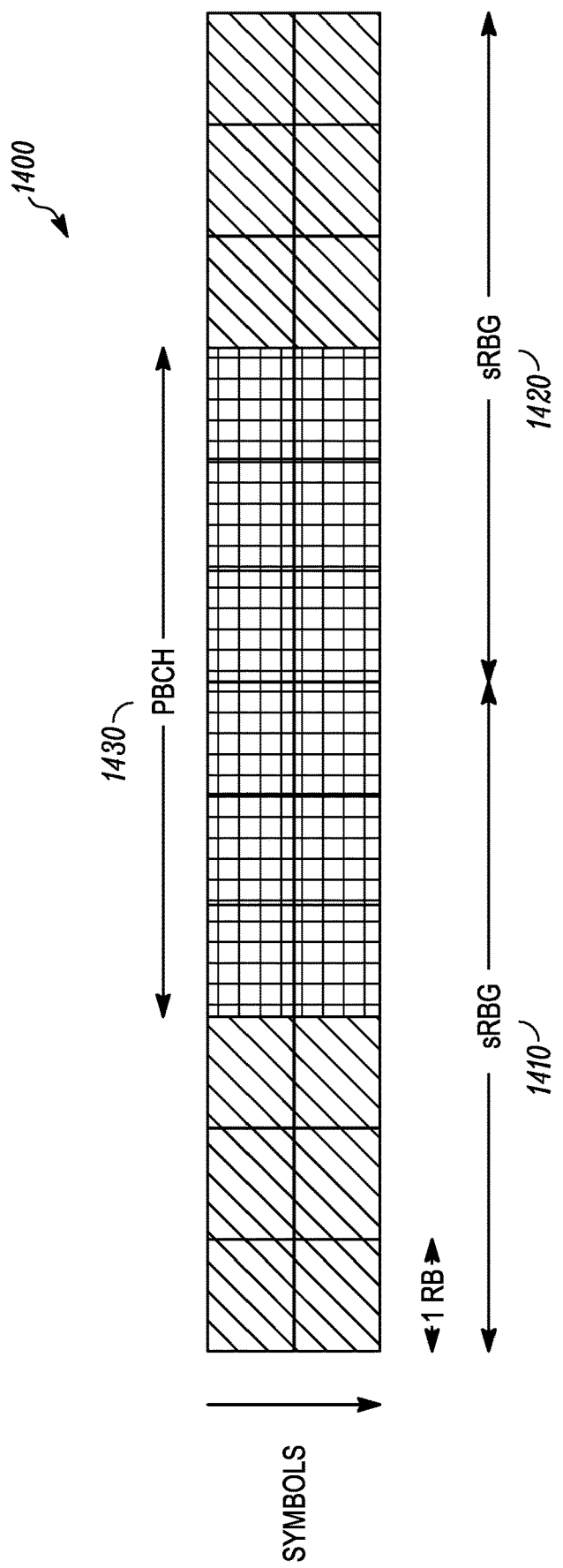
FIG. 14 illustrates example sRBGs where two sRBGs and can overlap with Physical Broadcast Channel (PBCH) resources, according to a possible embodiment.
Figure 15:
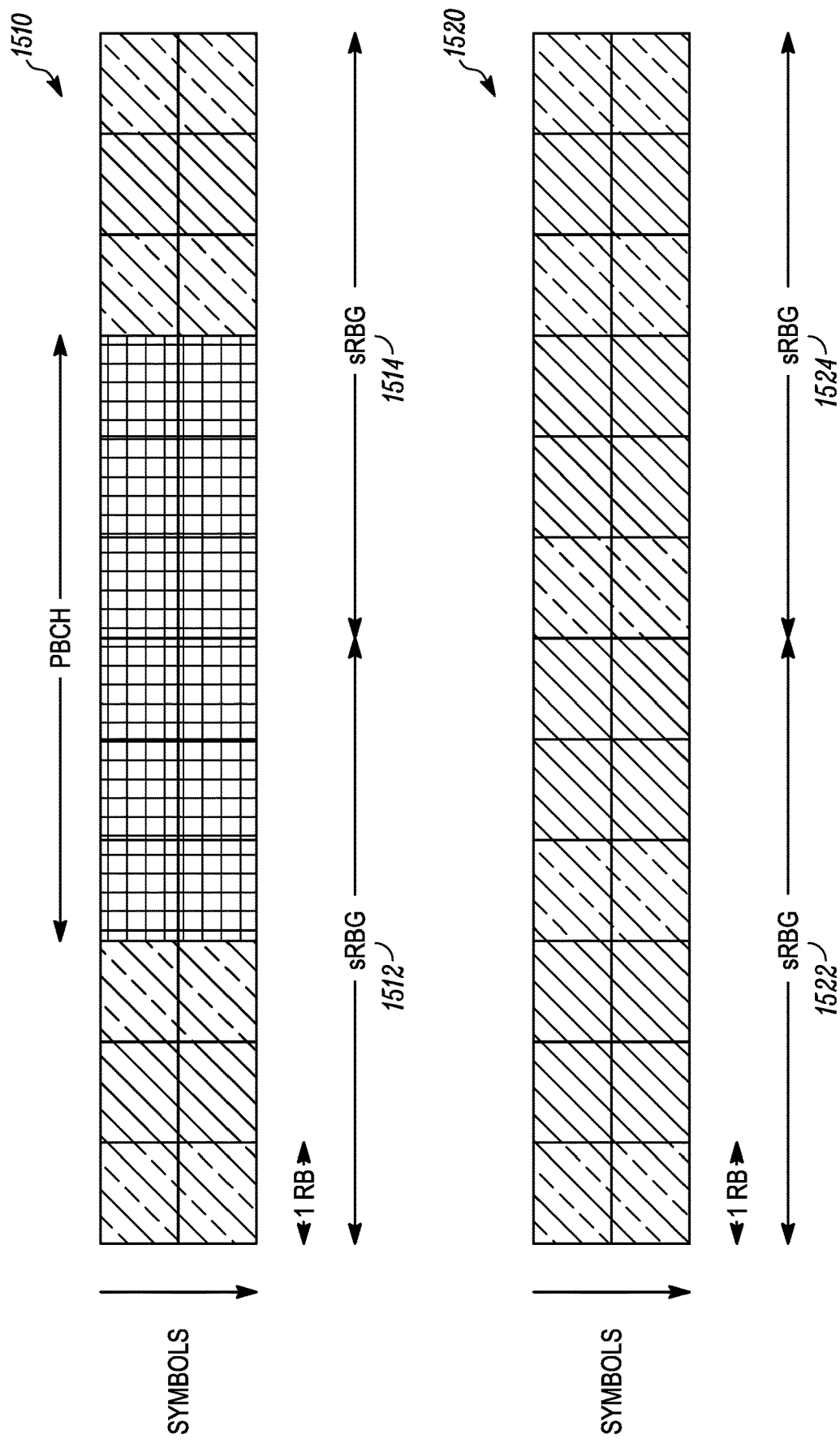
FIG. 15 illustrates an example of different control resource mapping, according to a possible embodiment.

In a possible embodiment, for sTTI operation, RBs containing PBCH are not included in the mapping of control resources in sTTI 3 and sTTI 4. The mapping of control resources can be "sREGs to sCCE mapping" and/or "sCCE to sPDCCH aggregation mapping". FIG. 14 illustrates example sRBGs 1400 where two sRBGs 1410 and 1420 can overlap with PBCH resources 1430. The UE 110 can determine the mapping of control resources based on the presence of the PBCH. FIG. 15 illustrates example sTTI 3 and sTTI 4 1510 in a subframe that can overlap with PBCH. The mapping of control resources can be different than the mappings used in the sTTIs not overlapping with PBCH. For example, if CRS-based/DMRS sPDCCH with AL=4 can be used in sTTI 4 over two symbols, assuming 36 REs/sCCE, instead of having a sPDCCH decoding candidate spanning the left entire example sRBG illustrated in FIG. 15, which for example can be the case for some other sTTIs in the subframe/or other subframes, the candidate can span the entire resources, excluding the PBCH RBs of both right and left sRBGs.

In another example illustrated in FIG. 15, an example distributed CRS-based/DMRS-based sPDCCH candidate 1520 can take RBs in the central 6 RBs in sTTIs 3 or sTTI 4 in a subframe not containing PBCH or in other sTTIs if a subframe containing PBCH, can take a different set of RBs outside the PBCH RBs in an sTTI overlapping with PBCH. The PBCH can span across $1^{st}$ and $2^{nd}$ sRBGs. FIG. 15 illustrates an example of different control resource mapping, with AL=2 and with 4 sREG/sCCE, for an sTTI overlapping with PBCH 1510 in an example sTTI 3, and sTTI 4 in time and for another sTTI not overlapping with PBCH candidate 1510. In an example, the PBCH candidate 1510 can span across $1^{st}$ and $2^{nd}$ sRBGs 1512 and 1514 and the sPDCCH candidate 1520 can span across $1^{st}$ and $2^{nd}$ sRBGs 1522 and 1524, as illustrated.

Figure 16:
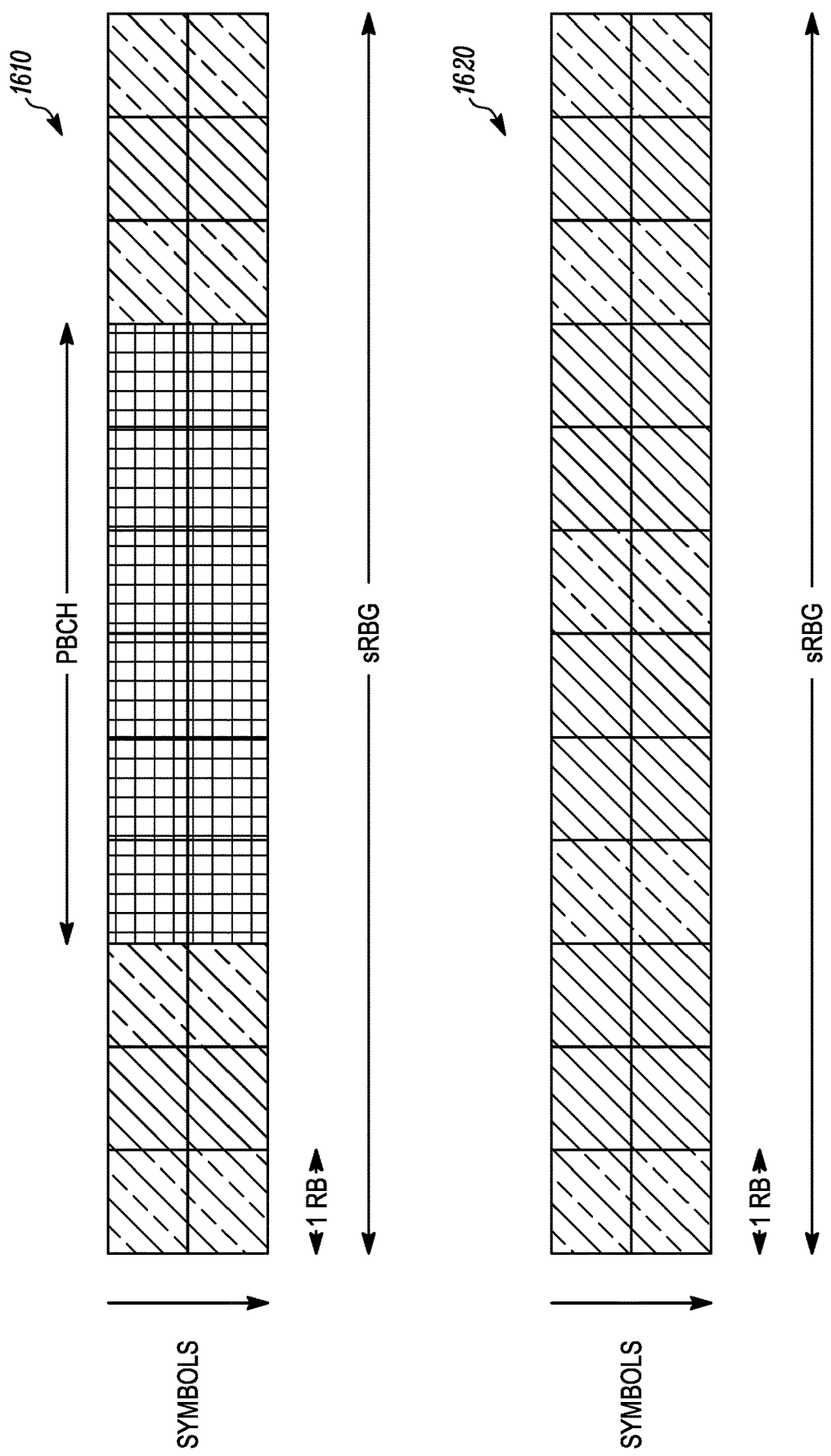
FIG. 16 illustrates a similar example to the example shown in FIG. 15 but with a single sRBG of twelve (12) RBs, according to a possible embodiment.

FIG. 16 illustrates a similar example to the example shown in FIG. 15 but with a single sRBG of twelve (12) RBs. In contrast to the example shown in FIG. 15, a distributed CRS-based/DMRS-based sPDCCH candidate 1620 can span a width of a single sRBG. Similarly, in a possible embodiment, for sTTI operation, RBs containing Secondary Synchronization Signal (SSS)/Primary Synchronization Signal (PSS) can be excluded from mapping of control resources in sTTIs overlapping with SSS/PSS in the time domain. The mapping of control resources can be "sREGs to sCCE mapping" and/or "sCCE to sPDCCH aggregation mapping."

In another embodiment, in a case where sRBG can be larger than 6 RBs, the sRBG containing/overlapping with PBCH can be excluded from mapping/monitoring control information, such as when sPDCCH PRB-set can be excluded from overlap with PBCH containing sRBG, in example, sTTIs 3 & 4, having a different sREG to sCCE mapping, having a different number of sREGs per sCCE in such sRBG, having a different monitoring rule in that case, or having a different sRBG definition in those sTTIs. These principles can be applied similarly for primary or secondary synchronization signals. The UE 110 can be excluded from being expected to monitor an EPDCCH candidate, if an ECCE corresponding to that EPDCCH candidate can be mapped to a PRB pair that can overlap in frequency with a transmission of either PBCH or primary or secondary synchronization signals in the same subframe.

The minimum unit of resource allocation for a resource allocation type for sTTI operation, referred to as sRBG, size can be set such that multiple system, or sTTI-related, Bandwidth (BW) can have the same sRBG size. An sRBG can be an integer of RBG size which can be a function of system BW. For instance, for 50 RB system BW, the RBG size is 3 RB, and for 75 and 100 RB system BW, the RBG size is 4 RBs. An sRBG for 50 RB BW can compose of 4 RBGs resulting in 12 REs and an sRBG for 75 or 100 RB BW, can compose of 3 RBGs resulting in 12 REs.

In another embodiment, a fixed number of sREGs per sCCE can be used for a common design perspective across sTTIs. For example, an sREG can include 1 RB within 1 OFDM symbol. A legacy/regular REG can include 4 REs. A legacy/regular RB can be a unit of 84 REs, such as 21 REGs, which is 12 subcarriers by 7 symbols. Using Extended Cyclic Prefix, the number of symbols within a subframe can become 6 and a single RB can be a unit of 72 REs, such as 18 REGs. 4 sREGs per sCCE can be considered as a conservative approach. Alternatively, 3 sREGs per sCCE can be considered, however in cases of high overhead, higher aggregation levels might be needed or AL=1 candidates may be restricted to certain locations. Considering resource allocation bit reduction for sTTI compared to 1 ms DCIS, the sPDCCH payload can be smaller than that of the PDCCH and less REs/CCE can be used. In another embodiment, sREGs forming an sCCE can be mapped to the RBs of an RB set under the localized sREG-to-sCCE mapping on continuous RBs belonging to an sRBG, such as when sCCEs don't cross the sRBG boundary, with time first mapping.

In another embodiment, regarding how the decoding candidates per aggregation level get mapped to the available resources if the number of symbols per RB set can be more than 1, the decoding candidates, such as PDCCH decoding candidates, per aggregation level can be mapped to the available resources using frequency first mapping in which small ALs are mapped within the first symbol and higher ALs are distributed amongst symbols. This methodology can be used when higher ALs may not be able to fit within the sPDCCH resources given in a single symbol. This can also can be used when the UE 110 needs higher AL that are not generally in good channel condition and they do not generally attain much benefit in latency reduction even with a single HARQ timeline. The decoding candidates can be the number of CCE indexes searched by the UE 110 in a subframe for a particular search space.

The decoding candidates per aggregation level can be mapped to the available resources based on the RB-set size, such as smaller than a given number "K" of RB in the RB set, over two symbols. Otherwise the decoding candidates can be mapped over a single symbol, which one of the two possible symbols for a single symbol mapping can be Radio Resource Control (RRC) or based on the UE ID and sub-frame/slot/sTTI index. In another embodiment, generally, DMRS-based sPDCCH can be used to attain beamforming gain in which case it can use local sREG-to-sCCE mapping, but in Multicast-Broadcast Single-Frequency Network (MBSFN) subframes or in normal subframes but in sTTIs without CRS, DMRS-based sPDCCH can be used to attain frequency diversity. The UE 110 in those sTTIs/subframes can assume DMRS-based sPDCCH with localized mapping, if it is configured by the network 130.

In another embodiment, in regarding how many symbols can be considered per RB set for DMRS-based sPDCCH over the 3-symbol sTTIs, from commonality perspective with two-symbol sTTI, two symbols can be used per RB set for DMRS-based sPDCCH over the 3-symbol sTTIs. This can also avoid CRS containing symbol overlapping with control resources in sTTI1 & 5.

According to different scenarios, DMRS for orphan symbols in a 3-symbol sTTI can be assigned a different AP, the same AP for the same UE for sPDSCH, or it can be used for CRS-based sPDSCH. The network 130 can implicitly or explicitly configure one or more of these three scenarios based on the configuration or specification, and the UE 110 can assume one or more of those scenarios. In another embodiment, some Component Carriers (CCs) in a case of carrier aggregation can use CRS-based sPDCCH and some CC's can use DMRS-based sPDCCH for scheduling, such as per CC configuration. Cross-carrier scheduling of one CC from another CC can allow DMRS-based sPDCCH scheduling CRS-based sPDSCH. In another embodiment, a fallback mode can be utilized. The UE 110 can be configured to monitor DMRS-based sPDCCH, but in some subframes it can monitor CRS-based sPDCCH as a fallback if one or more of fallback condition occur.

Figure 17:
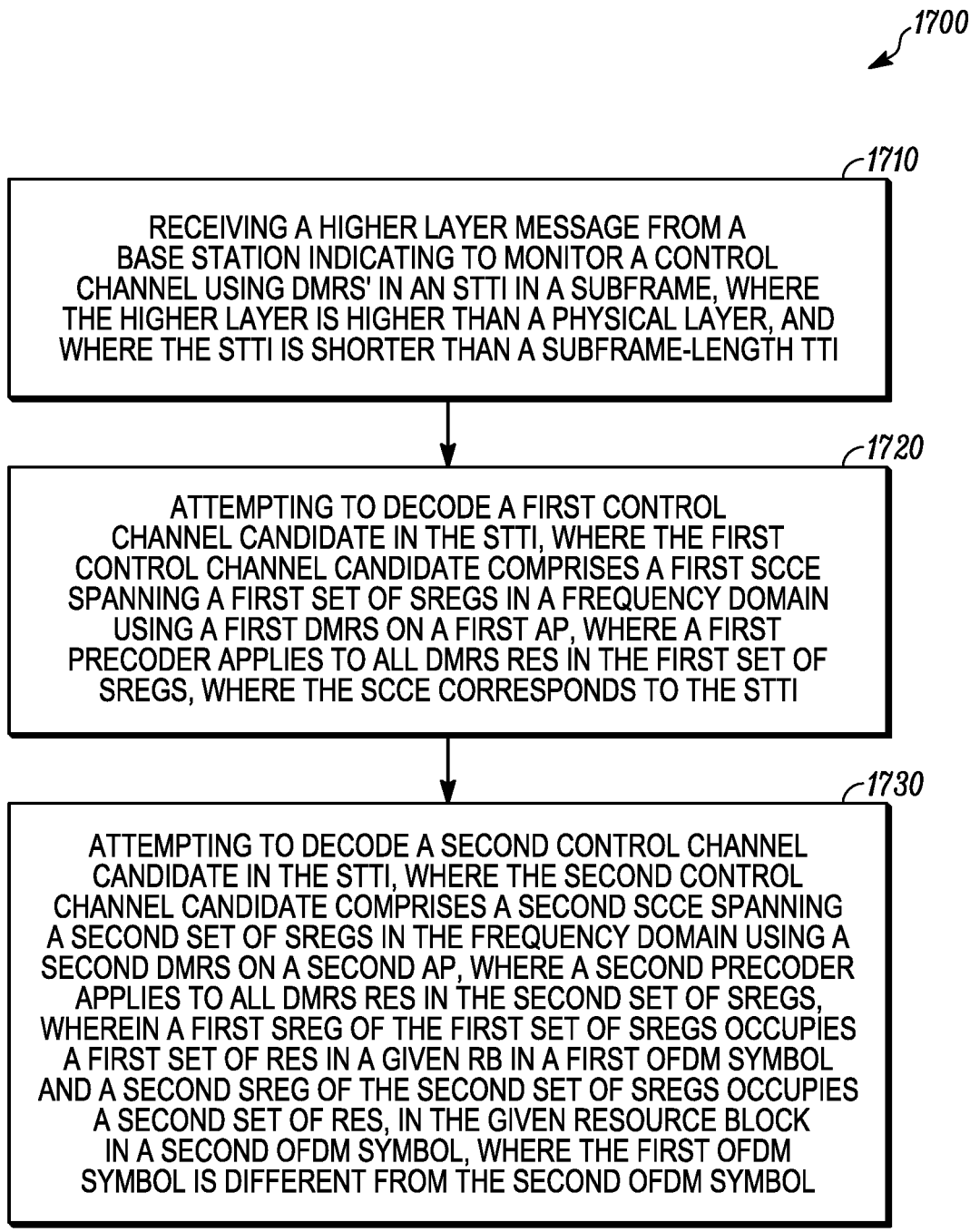
FIG. 17 illustrates an example flowchart illustrating operation of an apparatus such as a user equipment, according to a possible embodiment.

FIG. 17 illustrates an example flowchart 1700 illustrating operation of an apparatus such as the UE 110, according to a possible embodiment. At 1710, the higher layer message(s) 140 from the network entity 120, such as a base station, indicating to monitor a control channel using DMRS's in an sTTI in a subframe can be received, where the higher layer can be higher than a physical layer, and where the sTTI can be shorter than a subframe-length TTI.

At 1720, a first control channel candidate in the sTTI can be attempted to be decoded, for example by the UE 110. The first control channel candidate can comprise a first sCCE (sCCE1) spanning a first set of sREGs in a frequency domain using a first DMRS on a first AP. A first precoder can apply to all DMRS REs in the first set of sREGs, where a sCCE corresponds to the sTTI. For sTTI, 1 sREG can equal 1 RB over one symbol. For example, referring to FIG. 12, a first set of sREGs (sCCE1) can occupy REs in RB1, sym 0 and a second set of sREGs (sCCE2) can occupy REs in RB1, sym 1.

At 1730, a second control channel candidate in the sTTI can be attempted to be decoded, for example by the UE 110. The second control channel candidate can comprise a second sCCE spanning a second set of sREGs in the frequency domain using a second DMRS on a second AP. A second precoder can apply to all DMRS REs in the second set of sREGs. A first sREG of the first set of sREGs can occupy a first set of REs in a given RB in a first OFDM symbol of the sTTI and a second sREG of the second set of sREGs (sCCE2) can occupy a second set of REs, in the given RB in a second OFDM symbol of the sTTI, where the first OFDM symbol can be different from the second OFDM symbol.

According to a possible embodiment, some sREGs in the first set of sREGs (sCCE1) occupy same RBs in both the first OFDM symbol and the second OFDM symbol and another sREG in the first set of sREGs (sCCE1) for the given RB occupying only one OFDM symbol. For example, referring to FIG. 12, a first set of sREGs (sCCE1) can occupy REs in RB1, sym 0 and a second set of sREGs (sCCE2) can occupy REs in RB1, sym 1. According to a possible embodiment, the control candidates can include one or more CCEs. According to a possible embodiment, the number of PRBs in a sCCE can be the same for each sCCE. According to a possible embodiment, a control channel can be a sPDCCH and the flowcharts can be performed by the UE 110.

According to a possible embodiment, a precoding granularity of a precoder for the first sCCE can comprise multiple resource blocks in the frequency domain that are equal to the number resource blocks in the first OFDM symbol. The precoding granularity can be based on Precoder Resource block Group (PRG) bundling. As understood to one of ordinary skill in the art, precoder granularity of a number of PRBs can mean the same precoder can be provided for the number of PRBs.

According to a possible embodiment, the first control channel candidate and the second control channel candidate can each comprise a single sCCE. For example, this can be for an aggregation level 1. A number of sCCEs in a control channel candidate can also be based on the sCCE aggregation level. A sCCE can include 3 sREGs, such as 3 RBs. According to a possible embodiment, the first AP can be used for even control channel (sPDCCH) candidates of a size of one sCCE and the second AP can be used for odd control channel (sPDCCH) candidates of a size of one CCE. According to a possible embodiment, the first AP can be further based on a UE Identifier (ID). For example, the UE ID can equate to a User Equipment Identifier, such as Cell-RNTI (C-RNTI). According to a possible embodiment, the first AP can be further based on an index of the first sCCE.

In a possible embodiment, the higher layer message can be a first higher layer message, the sTTI can be a first sTTI, and the subframe can be a first subframe, flowchart 1700 can further comprise receiving a downlink signal from the base station, determining a number of CRS APs based on the received downlink signal, receiving a second higher layer message to monitor a third control channel candidate using DMRS's in at least one sTTI in a second subframe, where the second higher layer can be higher than a physical layer. Flowchart 1700 can further include determining whether to monitor the third control channel candidate using DMRS's in a second sTTI of the at least one sTTI based on the determined number of CRS APs in response to receiving the second higher layer message and attempting to decode the third control channel candidate using a third DMRS in the second sTTI if it can be determined to monitor the control channel candidate using DMRS in the second sTTI.

In a possible embodiment, control symbols in the sTTI can overlap with a CRS containing symbol. Flowchart 1700 can further include determining to exclude monitoring of a sPDCCH using given DMRS's in the sTTI of the sTTI when the determined number of CRS APs can be larger than a threshold number of APs.

Figure 18:
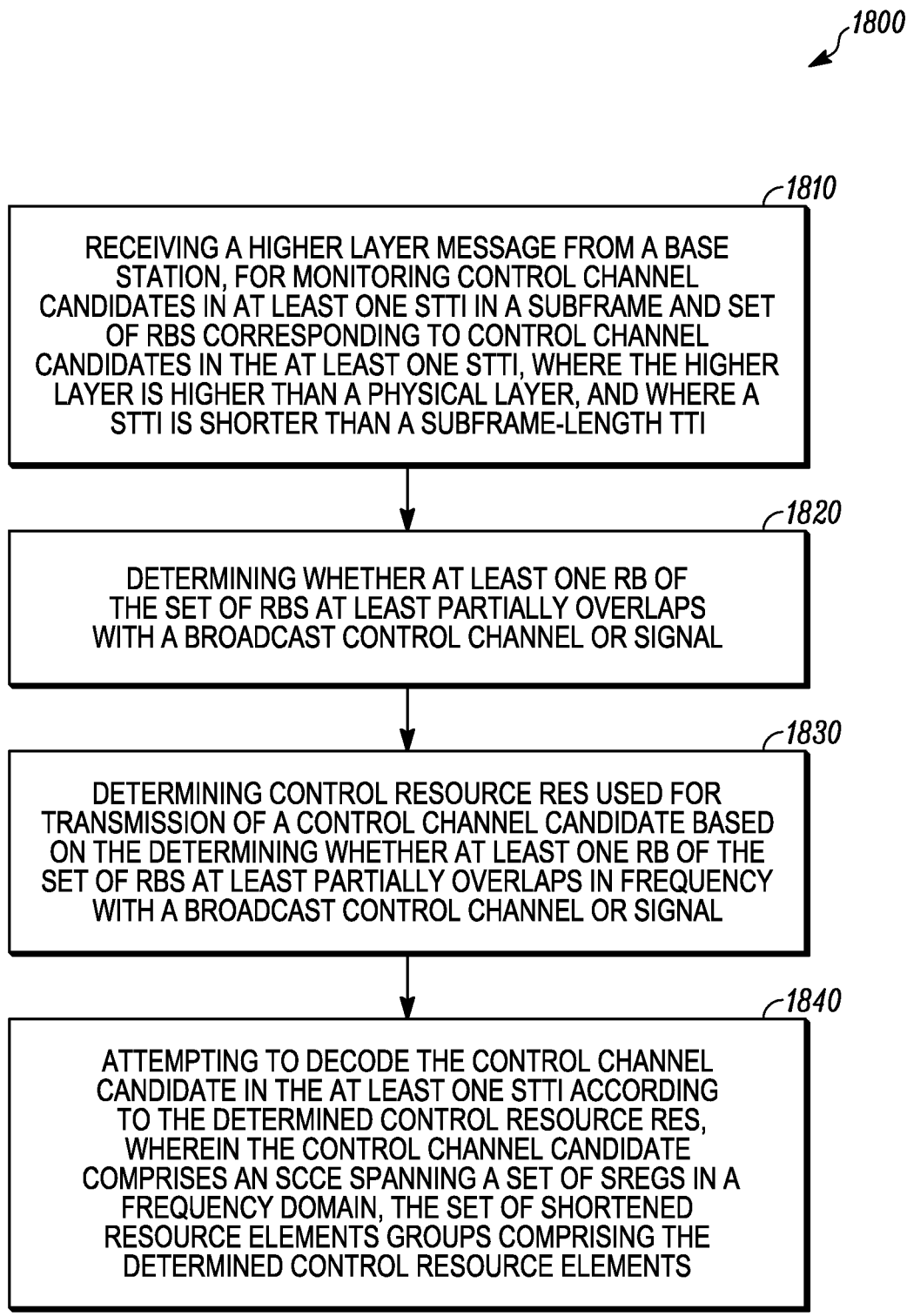
FIG. 18 illustrates another example flowchart illustrating operation of an apparatus such as the user equipment, according to a possible embodiment.

FIG. 18 illustrates another example flowchart 1800 illustrating operation of an apparatus such as the UE 110, according to a possible embodiment. At 1810, a higher layer message from a base station for monitoring control channel candidates in at least one sTTI in a subframe and set of RBs corresponding to control channel candidates in the at least one sTTI, can be received, where the higher layer can be higher than a physical layer, and where a sTTI can be shorter than a subframe-length TTI.

At 1820, whether at least one RB of the set of RBs at least partially overlaps with a broadcast control channel or signal can be determined. At 1830, control resource REs used for transmission of a control channel candidate based on the determining whether at least one RB of the set of RBs at least partially overlaps in frequency with a broadcast control channel or signal, can be determined.

At 1830, decoding the control channel candidate in the at least one sTTI according to the determined control resource REs, can be attempted, wherein the control channel candidate can comprise an sCCE spanning a set of sREGs in a frequency domain.

According to a possible embodiment, the flowchart 1800 can further include using a first mapping to map control information to control resource REs used for transmission of the control channel candidate if at least one RB of the set of RBs at least partially overlaps in frequency with a broadcast control channel or signal, and using a second mapping to map control information to control resource REs used for transmission of the control channel candidate if none of the RBs of the set of RBs overlap in frequency with a broadcast control channel or signal, wherein the first and the second mappings are different.

In an example, the control information can be excluded from being mapped to the at least one RB of the set of RBs that at least partially overlaps with the broadcast control channel or signal. In an example, control information can be excluded from being mapped to a second set of RBs if the at least one RB of the set of RBs that at least partially overlaps with the broadcast control channel or signal belong to the second set of RBs, wherein the second set of RBs can be a subset of the set of RBs. In an example, the second set of RBs can form a resource block group (RBG), where an RBG can be a unit of scheduling downlink data transmissions. In an example, the RBG size can be larger than 6 resource blocks.

According to a possible embodiment, the set of sREGs of the sCCE can be a first set of sREGs if at least one RB of the set of RBs at least partially overlaps in frequency with a broadcast control channel or signal. According to a possible embodiment, a second set of sREGs if none of the RBs of the set of RBs overlap in frequency with a broadcast control channel or signal. In an example, the first and the second set of sREGs can be different. In an example, the first set of sREGs can be a subset of the second set of sREGs.

According to a possible embodiment, the control channel candidate can comprise a set of sCCEs, and the set of sCCEs can be a first set of sCCEs if at least one RB of the set of RBs at least partially overlaps in frequency with a broadcast control channel or signal, and can be a second set of sCCEs if none of the RBs of the set of RBs overlap in frequency with a broadcast control channel or signal. In an example, the first and the second set of sCCEs can be different. According to a possible embodiment, the flowchart 1800 can further include monitoring, such as by UE 110, the control channel using DMRS's in the at least sTTI. In an example, at least a subset of the set of sREGs can use a DMRS on an AP, where a single-layer precoder applies to all DMRS REs in the at least subset of the set of sREGs. In a possible embodiment, the at least one sTTI can comprise one of a first two sTTIs in a second slot of a subframe. In a possible embodiment, at least one RB of the set of RBs can comprise synchronization signals, the REs in the at least one RB of the set of RBs not used for determining control resource elements for the control channel candidate in the at least one sTTI overlapping with the synchronization signals in the time domain.

Figure 19:
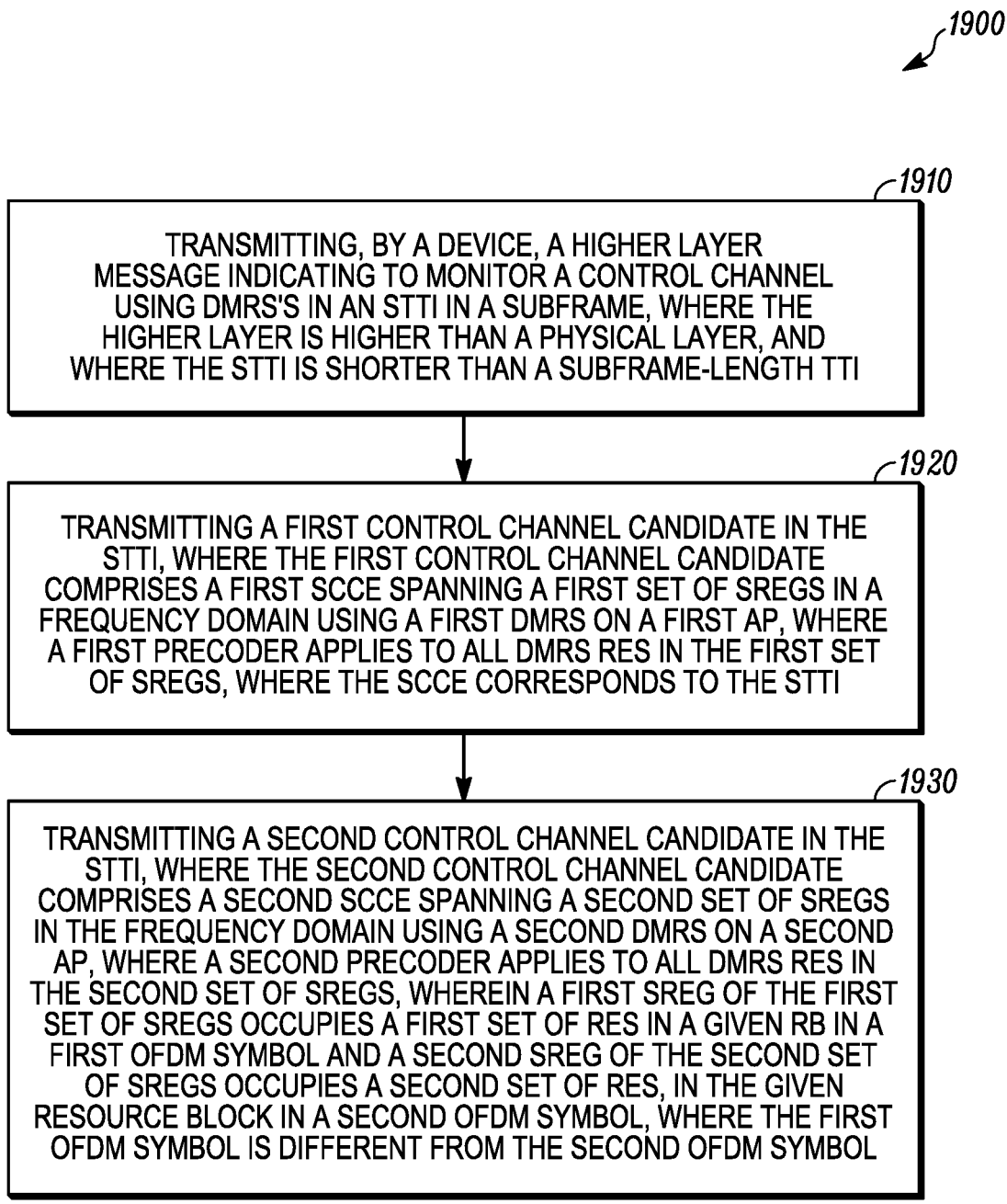
FIG. 19 illustrates an example flowchart illustrating operation of an apparatus such as a network entity, according to a possible embodiment.

FIG. 19 illustrates an example flowchart 1900 illustrating operation of an apparatus such as the network entity 120, according to a possible embodiment. At 1910, a higher layer message indicating to monitor a control channel using DMRS's in a sTTI in a subframe can be transmitted. The higher layer can be higher than a physical layer, and the sTTI can be shorter than a subframe-length TTI.

At 1920, a first control channel candidate in the short transmit time interval can be transmitted, for example by the network entity 120. The first control channel candidate can comprise a first sCCE (sCCE1) spanning a first set of sREGs in a frequency domain using a first DMRS on a first AP. A first precoder can apply to all DMRS REs in the first set of sREGs, where a sCCE corresponds to the sTTI. For sTTI, 1 sREG can equal 1 RB over one symbol. For example, referring to FIG. 12, a first set of sREGs (sCCE1) can occupy REs in RB1, sym 0 and a second set of sREGs (sCCE2) can occupy REs in RB1, sym 1.

At 1930, a second control channel candidate in the sTTI can be transmitted, for example by the network entity 120. The second control channel candidate can comprise a second sCCE spanning a second set of sREGs in the frequency domain using a second DMRS on a second AP. A second precoder can apply to all DMRS REs in the second set of sREGs. A first sREG of the first set of sREGs can occupy a first set of REs in a given RB in a first OFDM symbol of the sTTI and a second sREG of the second set of sREGs (sCCE2) can occupy a second set of REs, in the given RB in a second OFDM symbol of the sTTI, where the first OFDM symbol can be different from the second OFDM symbol.

According to a possible embodiment, some sREGs in the first set of sREGs (sCCE1) occupy same RBs in both the first OFDM symbol and the second OFDM symbol and another sREG in the first set of sREGs (sCCE1) for the given RB occupying only one OFDM symbol. For example, referring to FIG. 12, a first set of sREGs (sCCE1) can occupy REs in RB1, sym 0 and a second set of sREGs (sCCE2) can occupy REs in RB1, sym 1. According to a possible embodiment, the control candidates can include one or more CCEs. According to a possible embodiment, the number of PRBs in a sCCE can be the same for each sCCE. According to a possible embodiment, a control channel can be a sPDCCH and the flowcharts can be performed by the UE 110.

According to a possible embodiment, a precoding granularity of a precoder for the first sCCE can comprise multiple resource blocks in the frequency domain that are equal to the number resource blocks in the first OFDM symbol. The precoding granularity can be based on Precoder Resource block Group (PRG) bundling. As understood to one of ordinary skill in the art, precoder granularity of a number of PRBs can mean the same precoder can be provided for the number of PRBs.

According to a possible embodiment, the first control channel candidate and the second control channel candidate can each comprise a single sCCE. For example, this can be for an aggregation level 1. A number of sCCEs in a control channel candidate can also be based on the sCCE aggregation level. A sCCE can include 3 sREGs, such as 3 RBs. According to a possible embodiment, the first AP can be used for even control channel (sPDCCH) candidates of a size of one sCCE and the second AP can be used for odd control channel (sPDCCH) candidates of a size of one CCE. According to a possible embodiment, the first AP can be further based on a UE Identifier (ID). For example, the UE ID can equate to a User Equipment Identifier, such as Cell-RNTI (C-RNTI). According to a possible embodiment, the first AP can be further based on an index of the first sCCE.

Figure 20:
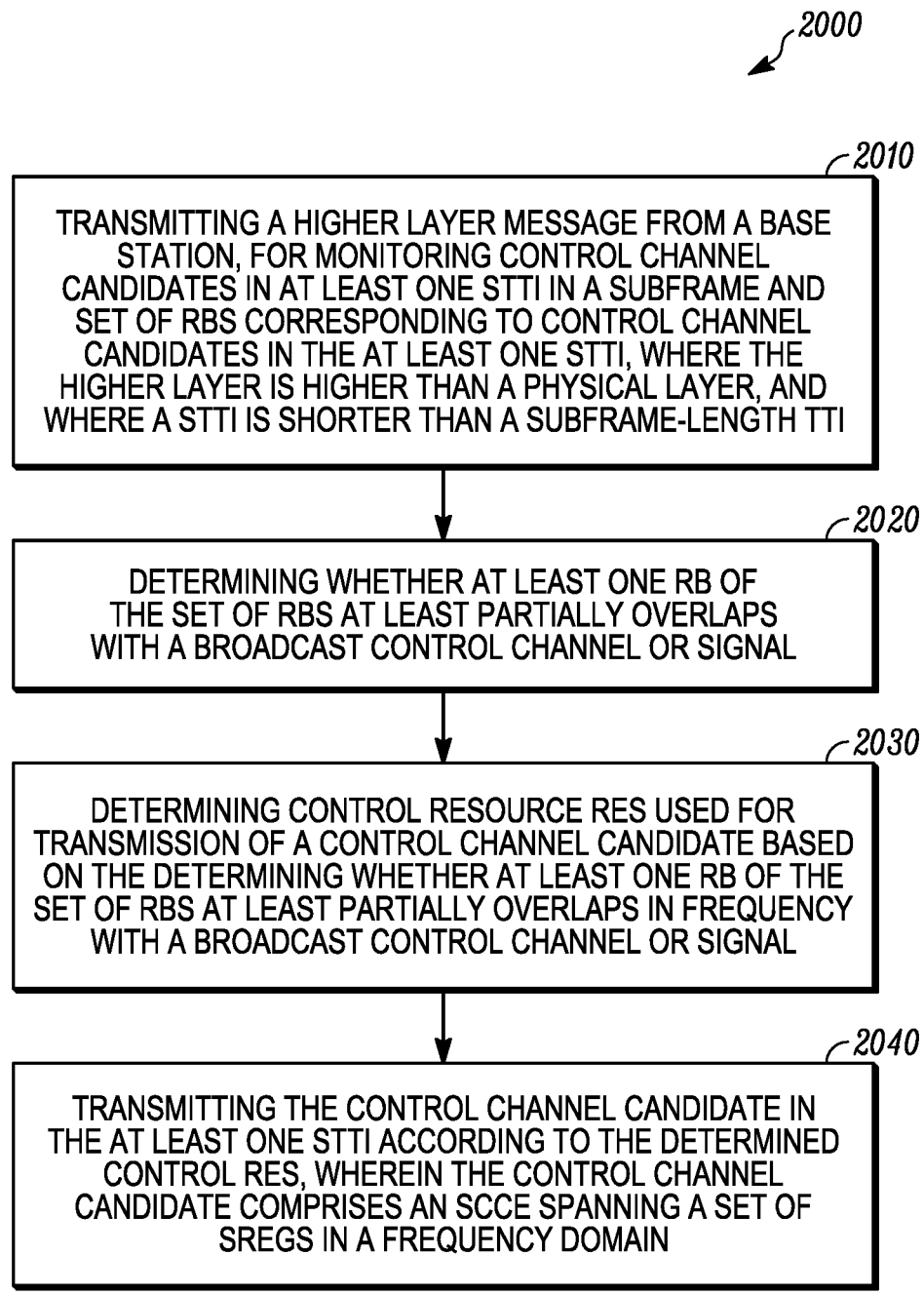
FIG. 20 illustrates another example flowchart illustrating operation of an apparatus such as the network entity, according to a possible embodiment.

FIG. 20 illustrates an example flowchart 2000 illustrating operation of an apparatus such as the network entity 120, according to a possible embodiment. At 2010, a higher layer message for monitoring control channel candidates in at least one sTTI in a subframe and set of RBs corresponding to control channel candidates in the at least one Stti can be transmitted. The higher layer can be higher than a physical layer. An sTTI can be shorter than a subframe-length TTI. At least one RB of the set of RBs at least can partially overlap with a broadcast control channel or signal.

At 2020, whether at least one RB of the set of RBs at least partially overlaps with a broadcast control channel or signal can be determined.

At 2030, control REs used for transmission of a control channel candidate based on the determining whether at least one RB of the set of RBs at least partially overlaps in frequency with a broadcast control channel or signal can be determined.

At 2040, the control channel candidate in the at least one sTTI according to the determined control REs can be transmitted, wherein the control channel candidate comprises an sCCE spanning a set of sREGs in a frequency domain.

According to a possible embodiment, the flowchart 2000 can further include using a first mapping to map control information to control resource REs used for transmission of the control channel candidate if at least one RB of the set of RBs at least partially overlaps in frequency with a broadcast control channel or signal, and using a second mapping to map control information to control resource REs used for transmission of the control channel candidate if none of the RBs of the set of RBs overlap in frequency with a broadcast control channel or signal, wherein the first and the second mappings are different.

In an example, the control information can be excluded from being mapped to the at least one RB of the set of RBs that at least partially overlaps with the broadcast control channel or signal. In an example, control information can be excluded from being mapped to a second set of RBs if the at least one RB of the set of RBs that at least partially overlaps with the broadcast control channel or signal belong to the second set of RBs, wherein the second set of RBs can be a subset of the set of RBs. In an example, the second set of RBs can form a resource block group (RBG), where an RBG can be a unit of scheduling downlink data transmissions. In an example, the RBG size can be larger than 6 resource blocks.

According to a possible embodiment, the set of sREGs of the sCCE can be a first set of sREGs if at least one RB of the set of RBs at least partially overlaps in frequency with a broadcast control channel or signal. According to a possible embodiment, a second set of sREGs if none of the RBs of the set of RBs overlap in frequency with a broadcast control channel or signal. In an example, the first and the second set of sREGs can be different. In an example, the first set of sREGs can be a subset of the second set of sREGs.

According to a possible embodiment, the control channel candidate can comprise a set of sCCEs, and the set of sCCEs can be a first set of sCCEs if at least one RB of the set of RBs at least partially overlaps in frequency with a broadcast control channel or signal, and can be a second set of sCCEs if none of the RBs of the set of RBs overlap in frequency with a broadcast control channel or signal. In an example, the first and the second set of sCCEs can be different. In a possible embodiment, the at least one sTTI can comprise one of a first two sTTIs in a second slot of a subframe. In a possible embodiment, RBs containing synchronization signals can be excluded from being included in the mapping of control resources in sTTIs overlapping with synchronization signals in the time domain.

Figure 21:
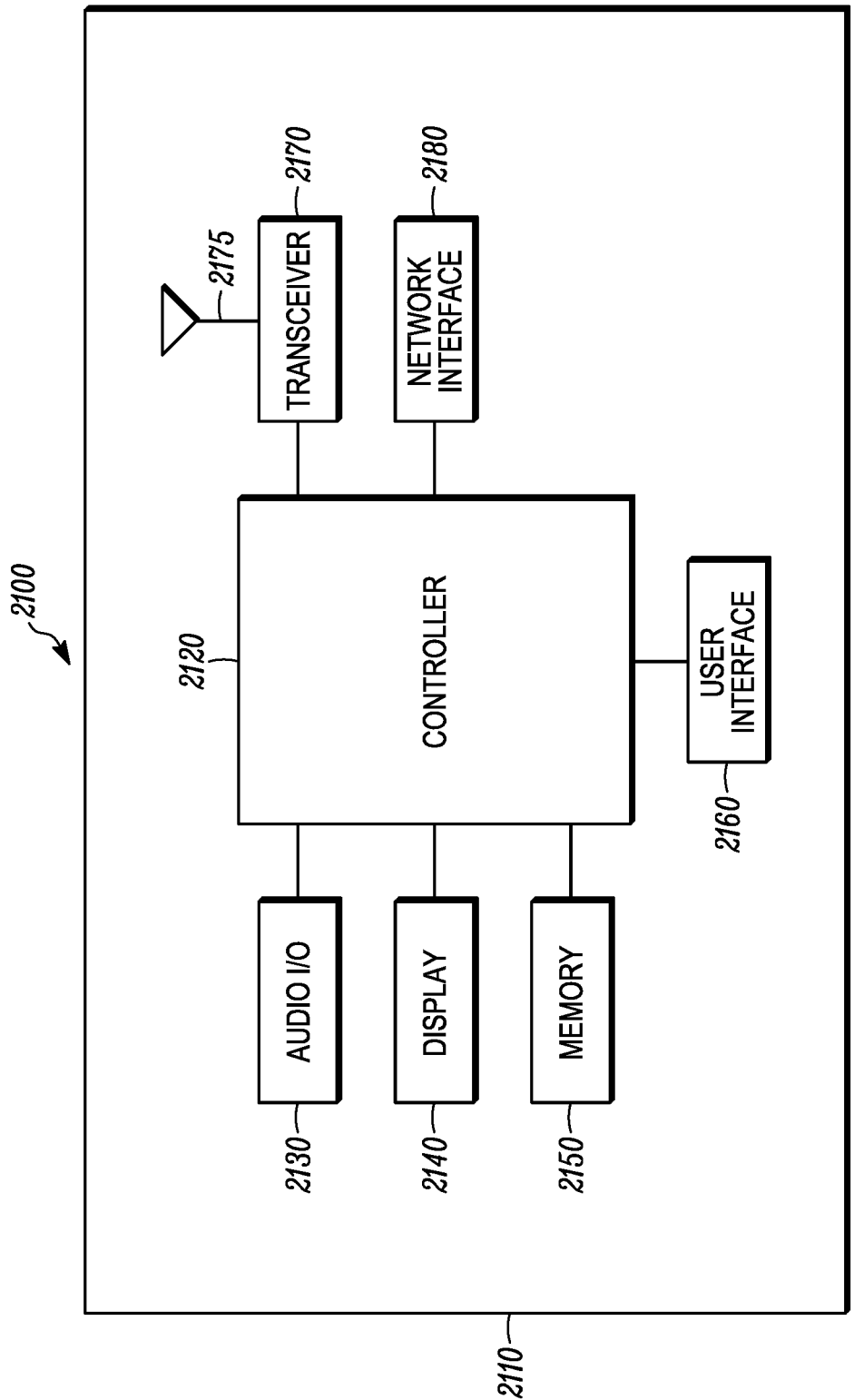
FIG. 21 illustrates an example block diagram of an apparatus, according to a possible embodiment.

FIG. 21 illustrates an example block diagram of an apparatus 2100, such as the UE 110, the network entity 120, the network entity 125, any of the entities within the network 130, and/or any other wireless or non-wireless communication device disclosed herein, according to a possible embodiment. The apparatus 2100 can include a housing 2110, a controller 2120 coupled to the housing 2110, audio input and output circuitry 2130 coupled to the controller 2120, a display 2140 coupled to the controller 2120, a transceiver 2170 coupled to the controller 2120, at least one antenna 2175 coupled to the transceiver 2170, a user interface 2160 coupled to the controller 2120, a memory 2150 coupled to the controller 2120, and a network interface 2180 coupled to the controller 2120. The apparatus 2100 may not necessarily include all of the illustrated elements for different embodiments of the present disclosure. The apparatus 2100 can perform the methods described in all the embodiments.

The display 2140 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 2170 can be one or more transceivers that can include a transmitter and/or a receiver. The audio input and output circuitry 2130 can include a microphone, a speaker, a transducer, or any other audio input and output circuitry. The user interface 2160 can include a keypad, a keyboard, buttons, a touch pad, a joystick, a touch screen display, another additional display, or any other device useful for providing an interface between a user and an electronic device. The network interface 2180 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 2150 can include a Random Access Memory (RAM), a Read Only Memory (ROM), an optical memory, a solid state memory, a flash memory, a removable memory, a hard drive, a cache, or any other memory that can be coupled to an apparatus.

The apparatus 2100 or the controller 2120 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 2150 or elsewhere on the apparatus 2100. The apparatus 2100 or the controller 2120 may also use hardware to implement disclosed operations. For example, the controller 2120 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 2120 may be any controller or processor device or devices capable of operating an apparatus and implementing the disclosed embodiments. Some or all of the additional elements of the apparatus 2100 can also perform some or all of the operations of the disclosed embodiments.

In operation as the UE 110, the transceiver 2170 can transmit and receive the various signals described above. In a possible embodiment, for example the transceiver 2170 can receive a higher layer message(s) 140, from the network entity 120, such as a base station, indicating to monitor a control channel using DMRS's in an sTTI in a subframe, where the higher layer can be higher than a physical layer, and where the sTTI can be shorter than a subframe-length TTI. In a possible embodiment, for example the controller 2120 can attempt to decode a first control channel candidate in the sTTI. The first control channel candidate can comprise a first sCCE spanning a first set of sREGs in a frequency domain using a first DMRS on a first AP. A first precoder can apply to all DMRS REs in the first set of sREGs, where a sCCE corresponds to an sTTI.

In a possible embodiment, for example the controller 2120 can attempt to decode a second control channel candidate in the sTTI. The second control channel candidate can comprise a second sCCE spanning a second set of sREGs in the frequency domain using a second DMRS on a second AP. A second precoder can apply to all DMRS REs in the second set of sREGs, where a first sREG of the first set of sREGs can occupy a first set of REs in a given RB in a first OFDM symbol and a second sREG of the second set of sREGs can occupy a second set of REs, in the given RB in a second OFDM symbol, where the first OFDM symbol can be different from the second OFDM symbol.

Furthermore, in addition to the possible embodiments discussed above, a further possible embodiment can include an apparatus and method that can include the transceiver 2170 to receive a downlink signal from a base station and determining a number of CRS APs based on the received downlink signal. The apparatus and method can further include the transceiver 2170 to receive a higher layer message for monitoring a control channel (sPDCCH) candidate using DMRS's in at least one sTTI in a subframe, where the higher layer can be higher than a physical layer, and where an sTTI can be shorter than a subframe-length TTI and determining whether to monitor the control channel candidate using DMRS in a first sTTI of the at least one sTTI based on the determined number of CRS APs in response to receiving the higher layer message. The apparatus and method can yet further include the controller 2120 to attempt to decode the control channel candidate using DMRS in the first sTTI if it can be determined to monitor the control channel candidate using DMRS in the first sTTI. The apparatus can be the UE 110 and method can be performed by the UE 110. In an example, the higher layer can be higher than the physical layer in that the higher layer message can be received on a layer above the physical layer. The control symbols in the first sTTI can overlap with a CRS containing symbol, and the apparatus and method can even yet further include determining to not monitor the sPDCCH using DMRS in a first sTTI of the one or more sTTIs when the determined number of CRS APs can be larger than a threshold number of APs. For example, the threshold can be two APs. In a possible embodiment, the UE 110 shall not monitor DMRS-based sPDCCH in sTTI 3, such as in an sTTI where two control symbols overlap with two CRS containing symbols, when four AP CRS can be applied.

Another possible embodiment can include an apparatus and method that can include the transceiver 2170 that can receive a higher layer message from a base station for monitoring control channel candidates in at least one sTTI in a subframe and set of RBs corresponding to control channel candidates in the at least one sTTI, where the higher layer can be higher than a physical layer, and where the sTTI can be shorter than a subframe-length TTI. The controller 2120 can determine whether at least one RB of the set of RBs at least partially overlaps with a broadcast control channel or signal and determine control REs used for transmission of a control channel candidate based on the determination whether the at least one RB of the set of RBs at least partially overlaps with the broadcast control channel or signal. The controller 2120 can further attempt to decode the control channel candidate in the at least one sTTI according to the determined control REs, where the control channel candidate comprises a sCCE spanning a set of sREGs in a frequency domain, the set of sREGs comprising the determined control REs.

In a possible embodiment, if at least one RB of the set of RBs at least partially overlaps in frequency with a broadcast control channel or signal, the controller 2120 can use a first mapping to map control information to control REs used for transmission of the control channel candidate and if none of the RBs of the set of RBs overlap in frequency with a broadcast control channel or signal, the controller 2120 can using a second mapping to map control information to control REs used for transmission of the control channel candidate, wherein the first and the second mappings are different. The control information can be excluded from being mapped to the at least one RB of the set of RBs that at least partially overlaps with the broadcast control channel or signal.

The set of RBs can be a first set of resource blocks, wherein the control information can be excluded from being mapped to a second set of RBs if the at least one RB of the first set of RBs that can at least partially overlap with the broadcast control channel or signal belong to the second set of RBs, wherein the second set of RBs can be a subset of the first set of RBs. The second set of RBs can form a RB group, where a RB group can be a unit of scheduling downlink data transmissions. The RB group size can be larger than 6 RBs.

The set of shortened RE groups of the sCCE can be a first set of sREGs if at least one RB of the set of RBs at least partially overlaps in frequency with a broadcast control channel or signal, and a second set of shortened resource element groups if none of the RBs of the set of RBs overlap in frequency with a broadcast control channel or signal, wherein the first and the second set of sREGs can be different. The first set of sREGs can be a subset of the second set of shortened resource element groups. The control channel candidate comprises a set of sCCEs, and the set of sCCEs can be a first set of sCCEs if at least one RB of the set of RBs at least partially overlaps in frequency with a broadcast control channel or signal, and a second set of sCCEs if none of the RBs of the set of RBs overlap in frequency with a broadcast control channel or signal, wherein the first and the second set of sCCEs can be different. The first set of sREGs can be a subset of the second set of sREGs. The control channel candidate can comprise a set of sCCEs, and the set of sCCEs can be a first set of sCCEs if at least one RB of the set of RBs can at least partially overlaps in frequency with a broadcast control channel or signal, and a second set of sCCEs if none of the RBs of the set of RBs can overlap in frequency with a broadcast control channel or signal, wherein the first and the second set of sCCEs are different.

The second set of sCCEs can be a subset of the first set of sCCEs. The controller 2120 can monitor the control channel using DMRS's in the at least sTTI. At least a subset of the set of sREGs can be use a DMRS on an AP, where a single-layer precoder can apply to all DMRS REs in the at least subset of the set of sREGs.

The at least one sTTI can comprises one of a first two sTTIs in a second slot of a subframe. RBS containing synchronization signals can be excluded from being included in the mapping of control resources in sTTIs overlapping with synchronization signals in the time domain. At least one RB of the set of RBs comprises synchronization signals, the RE in the at least one RB of the set of RBs can be excluded from being used for determining control REs for the control channel candidate in the at least one sTTI overlapping with the synchronization signals in the time domain.

In yet another possible embodiment, the transceiver 2170 can transmit a higher layer message indicating to monitor a control channel using DMRS in a sTTI in a subframe, where the higher layer can be higher than a physical layer, and where the sTTI can be shorter than a subframe-length TTI. The transceiver 2170 can further transmit a first control channel candidate in the sTTI, where the first control channel candidate can comprise a first sCCE spanning a first set of sREGs in a frequency domain using a first DMRS on a first AP. A first precoder can apply to all DMRS REs in the first set of sREGs, where the sREG corresponds to the sTTI. The transceiver 2170 can further transmit a second control channel candidate in the sTTI, where the second control channel candidate can comprise a second sCCE spanning a second set of sREGs in the frequency domain using a second DMRS on a second AP, where a second precoder can apply to all DMRS REs in the second set of sREGs, wherein a first sREG of the first set of sREGs can occupy a first set of REs in a given RB in a first OFDM symbol and a second sREG of the second set of sREGs can occupy a second set of REs, in the given RB in a second OFDM symbol. The first OFDM symbol can be different from the second OFDM symbol.

According to a possible embodiment, some sREGs in the first set of sREGs (sCCE1) occupy same RBs in both the first OFDM symbol and the second OFDM symbol and another sREG in the first set of sREGs (sCCE1) for the given RB occupying only one OFDM symbol. For example, referring to FIG. 12, a first set of sREGs (sCCE1) can occupy REs in RB1, sym 0 and a second set of sREGs (sCCE2) can occupy REs in RB1, sym 1. According to a possible embodiment, the control candidates can include one or more CCEs.

According to a possible embodiment, the number of PRBs in a sCCE can be the same for each sCCE. According to a possible embodiment, a control channel can be a sPDCCH and the flowcharts can be performed by the UE 110.

According to a possible embodiment, a precoding granularity of a precoder for the first sCCE can comprise multiple RBs in the frequency domain that are equal to the number resource blocks in the first OFDM symbol. The precoding granularity can be based on Precoder Resource block Group (PRG) bundling. As understood to one of ordinary skill in the art, precoder granularity of a number of PRBs can mean the same precoder can be provided for the number of PRBs.

According to a possible embodiment, the first control channel candidate and the second control channel candidate can each comprise a single sCCE. For example, this can be for an aggregation level 1. A number of sCCEs in a control channel candidate can also be based on the sCCE aggregation level. A sCCE can include 3 sREGs, such as 3 RBs. According to a possible embodiment, the first AP can be used for even control channel (sPDCCH) candidates of a size of one sCCE and the second AP can be used for odd control channel (sPDCCH) candidates of a size of one CCE. According to a possible embodiment, the first AP can be further based on a UE Identifier (ID). For example, the UE ID can equate to a User Equipment Identifier, such as Cell-RNTI (C-RNTI). According to a possible embodiment, the first AP can be further based on an index of the first sCCE.

In a possible embodiment, the higher layer message can be a first higher layer message, the sTTI can be a first sTTI, and the subframe can be a first subframe, 1700 can further comprise receiving a downlink signal from the base station, determining a number of CRS APs based on the received downlink signal, receiving a second higher layer message to monitor a third control channel candidate using DMRS's in at least one sTTI in a second subframe, where the second higher layer can be higher than a physical layer. 1700 can further include determining whether to monitor the third control channel candidate using DMRS's in a second sTTI of the at least one sTTI based on the determined number of CRS APs in response to receiving the second higher layer message and attempting to decode the third control channel candidate using a third DMRS in the second sTTI if it can be determined to monitor the control channel candidate using DMRS in the second sTTI.

In a possible embodiment, control symbols in the sTTI can overlap with a CRS containing symbol. 1700 can further include determining to exclude monitoring of a sPDCCH using given DMRS's in the sTTI of the sTTI when the determined number of CRS APs can be larger than a threshold number of APs.

In a possible embodiment, the transceiver 2170 can transmit a higher layer message from a base station for monitoring control channel candidates in at least one sTTI in a subframe and a set of RBs corresponding to control channel candidates in the at least one sTTI, can be received, where the higher layer can be higher than a physical layer, and where a sTTI can be shorter than a subframe-length TTI. The controller 2120 can determine whether at least one RB of the set of RBs at least partially overlaps with a broadcast control channel or signal. The controller 2120 can attempt decoding of the control channel candidate in the at least one sTTI according to the determined control resource REs, where the control channel candidate can comprise an sCCE spanning a set of sREGs in a frequency domain.

According to a possible embodiment, the controller 2120 can use a first mapping to map control information to control resource REs used for transmission of the control channel candidate if at least one RB of the set of RBs at least partially overlaps in frequency with a broadcast control channel or signal, and can use a second mapping to map control information to control resource REs used for transmission of the control channel candidate if none of the RBs of the set of RBs overlap in frequency with a broadcast control channel or signal, wherein the first and the second mappings are different.

In an example, the controller 2120 can excluded the control information from being mapped to the at least one RB of the set of RBs that at least partially overlaps with the broadcast control channel or signal. In an example, control information can be excluded from being mapped to a second set of RBs if the at least one RB of the set of RBs that at least partially overlaps with the broadcast control channel or signal belong to the second set of RBs, wherein the second set of RBs can be a subset of the set of RBs. In an example, the second set of RBs can form a resource block group (RBG), where an RBG can be a unit of scheduling downlink data transmissions. In an example, the RBG size can be larger than 6 RBs.

According to a possible embodiment, the set of sREGs of the sCCE can be a first set of sREGs if at least one RB of the set of RBs at least partially overlaps in frequency with a broadcast control channel or signal. According to a possible embodiment, a second set of sREGs if none of the RBs of the set of RBs overlap in frequency with a broadcast control channel or signal. In an example, the first and the second set of sREGs can be different. In an example, the first set of sREGs can be a subset of the second set of sREGs.

According to a possible embodiment, the control channel candidate can comprise a set of sCCEs, and the set of sCCEs can be a first set of sCCEs if at least one RB of the set of RBs at least partially overlaps in frequency with a broadcast control channel or signal, and can be a second set of sCCEs if none of the RBs of the set of RBs overlap in frequency with a broadcast control channel or signal. In an example, the first and the second set of sCCEs can be different. In a possible embodiment, the at least one sTTI can comprise one of a first two sTTIs in a second slot of a subframe. In a possible embodiment, RBs containing synchronization signals can be excluded from being included in the mapping of control resources in sTTIs overlapping with synchronization signals in the time domain.

Moreover, a further possible embodiment can include an apparatus and method that can include the transceiver 2170 to receive a higher layer message from a base station, for monitoring sPDCCH control channel using DMRS in a plurality of sTTIs in a subframe, where the higher layer can be higher than a physical layer, and where the sTTI can be shorter than a subframe-length TTI and attempting to decode sPDCCH using DMRS in a first sTTI wherein at least one control symbol in the first sTTI can be excluded from overlap with a CRS containing symbol. The apparatus and method can further include the controller 2120 to attempt to decode sPDCCH using DMRS in a second sTTI using DM-RS REs present in the first sTTI, wherein at least one control symbol in the second sTTI can overlap at least partially with a CRS containing symbol, and the second sTTI can be adjacent to the first sTTI. The apparatus can be the UE 110 and the method can be performed by the UE 110. In an example, DMRS-based sPDCCH can happen in sTTI "n" including CRS, or sTTIs wherein the control symbols overlap for DMRS-based sPDCCH with a CRS containing symbol, only when the DMRS can be shared between sTTI "n−1" and sTTI "n" and present in sTTI "n−1". In an example, the UE 110 can assume no DM-RS can be transmitted for sPDCCH candidates in sTTI n and can use the DM-RS REs from sTTI n−1 for demodulation of sPDCCH candidates in sTTI n. In an example, the UE 110 can use the same subcarriers for DM-RS in sTTI n−1 for attempting to decode sPDCCH in sTTI n as would be the case if DM-RS was transmitted on sTTI n. In an example, the DM-RS from sTTI n−1 can at least overlap in frequency with the sREGs associated with the sPDCCH in sTTI n. If the UE 110 can be configured to monitor, via the controller 2120, DMRS-based sPDCCH, the UE 110 can monitor the DMRS-based sPDCCH in an sTTI containing CRS, or sTTIs wherein the control symbols overlap with a CRS containing symbol, assuming DMRS can be shared between the previous sTTI and the current sTTI. In such a case, still the AL or location of the control might be different between the sTTIs sharing the DMRS, but the control resources of the second sTTI can fully overlapped with control and data resources of the first sTTI containing the DMRS. In an example, the second sTTI can follow the first sTTI.

In a possible embodiment, for example the transceiver 2170 can receive a higher layer message from a base station for monitoring control channel candidates in at least one sTTI in a subframe and set of RBs corresponding to control channel candidates in the at least one sTTI, where the higher layer can be higher than a physical layer, and where a sTTI can be shorter than a subframe-length TTI. The controller 2120 can determine a higher layer message from a base station for monitoring control channel candidates in at least one sTTI in a subframe and set of RBs corresponding to control channel candidates in the at least one sTTI, where the higher layer can be higher than a physical layer, and where a sTTI can be shorter than a subframe-length TTI and determine control resource REs used for transmission of a control channel candidate based on the determining whether at least one RB of the set of RBs at least partially overlaps in frequency with a broadcast control channel or signal. The controller 2120 can attempt to decode the control channel candidate in the at least one sTTI according to the determined control resource REs, wherein the control channel candidate comprises an sCCE spanning a set of sREGs in a frequency domain, the set of shortened resource elements groups comprising the determined control resource elements.

According to a possible embodiment, the controller 2170 can use a first mapping to map control information to control resource REs used for transmission of the control channel candidate if at least one RB of the set of RBs at least partially overlaps in frequency with a broadcast control channel or signal, and use a second mapping to map control information to control resource REs used for transmission of the control channel candidate if none of the RBs of the set of RBs overlap in frequency with a broadcast control channel or signal, wherein the first and the second mappings can be different. The second set of sCCEs can be a subset of the first set of sCCEs.

In an example, the controller 2170 can exclude control information from being mapped to the at least one RB of the set of RBs that at least partially overlaps with the broadcast control channel or signal. In an example, control information can be excluded from being mapped to a second set of RBs if the at least one RB of the set of RBs that at least partially overlaps with the broadcast control channel or signal belong to the second set of RBs, wherein the second set of RBs can be a subset of the set of RBs. In an example, the second set of RBs can form a resource block group (RBG), where an RBG can be a unit of scheduling downlink data transmissions. In an example, the RBG size can be larger than 6 RBs.

According to a possible embodiment, the set of sREGs of the sCCE can be a first set of sREGs if at least one RB of the set of RBs at least partially overlaps in frequency with a broadcast control channel or signal. According to a possible embodiment, a second set of sREGs if none of the RBs of the set of RBs overlap in frequency with a broadcast control channel or signal. In an example, the first and the second set of sREGs can be different. In an example, the first set of sREGs can be a subset of the second set of sREGs.

According to a possible embodiment, the control channel candidate can comprise a set of sCCEs, and the set of sCCEs can be a first set of sCCEs if at least one RB of the set of RBs at least partially overlaps in frequency with a broadcast control channel or signal, and can be a second set of sCCEs if none of the RBs of the set of RBs overlap in frequency with a broadcast control channel or signal. In an example, the first and the second set of sCCEs can be different. According to a possible embodiment, the controller 2170 can further monitor the control channel using DMRS's in the at least sTTI. In an example, the set of sREGs can use a DMRS on an AP, where a precoder applies to all DMRS REs in the set of sREGs. In a possible embodiment, the at least one sTTI can comprise one of a first two sTTIs in a second slot of a subframe. In a possible embodiment, the controller 2170 can exclude RBs containing synchronization signals from being included in the mapping of control resources in sTTIs overlapping with synchronization signals in the time domain.

Additionally, another further possible embodiment can include an apparatus and method that can include receiving a first higher layer message for monitoring a control channel candidate using CRS in at least one sTTI in a subframe, where the higher layer can be higher than a physical layer and receiving a second higher layer message indicating whether the control channel candidate in the at least one sTTI can be mapped to a first set of DMRS REs in control resources of the control channel candidate. The apparatus and method can further include attempting to decode the control channel candidate using CRS in the at least one sTTI based on the received second higher layer message when monitoring the control candidates. The apparatus can be the UE 110 and method can be performed by the UE 110. For example, the sPDCCH in the at least one sTTI can be rate-match around data DMRS REs in the sPDCCH control resources. In an example, the first set of DMRS REs can be associated with a downlink data transmission mode configured for the UE 110. In an example, the apparatus and method can further include receiving a third higher layer message indicating a number of control symbols for a control channel candidate using CRS and indicating the position of at least one control symbol in the at least one sTTI. In an example, the at least one sTTI comprises one or more symbols containing CRS, and the position of a control symbol for a sPDCCH in the at least one sTTI can be other than the position of at least one symbols containing CRS. In an example, a third sREG of the first set of sREGs (sCCE1) occupies a third set of REs in a given RB in the first OFDM symbol, such as REs in RB1, sym 0 illustrated in FIG. 12, and the first control candidate can be excluded from occupying REs in the given RB in the second OFDM symbol, except DMRS REs associated with the third sREG. In an example, the DMRS REs in the first and the second OFDM symbols associated with the third sREG can be determined based on at least the frequency location of DMRS REs corresponding to downlink data transmissions of a downlink data transmission mode.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:
1. A method in a first device, comprising:
transmitting, by the first device, a higher layer message to a second device for monitoring control channel candidates in at least one shortened transmission time interval in a subframe and a set of resource blocks corresponding to control channel candidates in the at least one shortened transmission time interval, where the higher layer is higher than a physical layer, and where the shortened transmission time interval is shorter than a subframe-length transmission time interval;

determining whether at least one resource block of the set of resource blocks at least partially overlaps with a broadcast control channel or signal;

determining control resource elements for transmission of a control channel candidate based on the determination of whether the at least one resource block of the set of resource blocks at least partially overlaps with the broadcast control channel or signal; and transmitting the control channel candidate in the at least one shortened transmission time interval according to the determined control resource elements, wherein the control channel candidate comprises a shortened control channel element spanning a set of shortened resource elements groups in a frequency domain, the set of shortened resource elements groups comprising the determined control resource elements, wherein the method further comprises:
  if at least one resource block of the set of resource blocks at least partially overlaps in frequency with a broadcast control channel or signal, using a first mapping to map control information to control resource elements used for transmission of the control channel candidate; and
  if none of the resource blocks of the set of resource blocks overlap in frequency with a broadcast control channel or signal, using a second mapping to map control information to control resource elements used for transmission of the control channel candidate, and wherein the first and the second mappings are different.

2. The method according to claim 1, wherein the control information is not mapped to the at least one resource block of the set of resource blocks that at least partially overlaps with the broadcast control channel or signal.

3. The method according to claim 1,
wherein the set of resource blocks is a first set of resource blocks,
wherein the control information is not mapped to a second set of resource blocks if the at least one resource block of the first set of resource blocks that at least partially overlaps with the broadcast control channel or signal belong to the second set of resource blocks, and
wherein the second set of resource blocks is a subset of the first set of resource blocks.

4. The method according to claim 2, wherein the second set of resource blocks form a resource block group, where a resource block group is a unit of scheduling downlink data transmissions.

5. The method according to claim 4, wherein the resource block group size is larger than 6 resource blocks.

6. The method according to claim 1,
wherein the set of shortened resource element groups of the shortened control channel element is a first set of shortened resource element groups if at least one resource block of the set of resource blocks at least partially overlaps in frequency with a broadcast control channel or signal, and a second set of shortened resource element groups if none of the resource blocks of the set of resource blocks overlap in frequency with a broadcast control channel or signal, and
wherein the first and the second set of shortened resource element groups are different.

7. The method according to claim 6, wherein the first set of shortened resource element groups is a subset of the second set of shortened resource element groups.

8. The method according to claim 1,
wherein the control channel candidate comprises a set of shortened control channel elements,
wherein the set of shortened control channel elements is a first set of shortened control channel elements if at least one resource block of the set of resource blocks at least partially overlaps in frequency with a broadcast control channel or signal, and a second set of shortened control channel elements if none of the resource blocks of the set of resource blocks overlap in frequency with a broadcast control channel or signal, and
wherein the first and the second set of shortened control channel elements are different.

9. The method according to claim 8, wherein the second set of shortened control channel elements is a subset of the first set of shortened control channel elements.

10. The method according to claim 1, wherein the at least one shortened transmission time interval comprises one of a first two shortened transmission time intervals in a second slot of a subframe.

11. The method according to claim 1, wherein resource blocks containing synchronization signals are not included in the mapping of control resources in shortened transmission time intervals overlapping with synchronization signals in the time domain.

12. The method according to claim 1, wherein at least one resource block of the set of resource blocks comprises synchronization signals, the resource elements in the at least one resource block of the set of resource blocks not used for determining control resource elements for the control channel candidate in the at least one shortened transmission time interval overlapping with the synchronization signals in the time domain.

13. The method according to claim 1, wherein the higher layer message configures the second device for monitoring control channel candidates in at least one shortened transmission time interval in a subframe and the higher layer message indicates a set of resource blocks of control channel candidates in the at least one shortened transmission time interval.

14. An apparatus, comprising:
  a transceiver to transmitting a higher layer message to a device for monitoring control channel candidates in at least one shortened transmission time interval in a subframe and a set of resource blocks corresponding to control channel candidates in the at least one shortened transmission time interval, where the higher layer is higher than a physical layer, and where the shortened transmission time interval is shorter than a subframe-length transmission time interval; and
  a controller coupled to the transceiver, the controller to
    determine whether at least one resource block of the set of resource blocks at least partially overlaps with a broadcast control channel or signal, and
    determine control resource elements for transmission of a control channel candidate based on the determination of whether the at least one resource block of the set of resource blocks at least partially overlaps with the broadcast control channel or signal,
  wherein the transceiver transmits the control channel candidate in the at least one shortened transmission time interval according to the determined control resource elements,
  wherein the control channel candidate comprises a shortened control channel element spanning a set of shortened resource elements groups in a frequency domain, the set of shortened resource elements groups comprising the determined control resource elements,
wherein the controller
uses a first mapping to map control information to control resource elements used for transmission of the control channel candidate based on at least one resource block of the set of resource blocks at least partially overlapping in frequency with a broadcast control channel or signal, and
uses a second mapping to map control information to control resource elements used for transmission of the control channel candidate based on none of the resource blocks of the set of resource blocks overlapping in frequency with a broadcast control channel or signal, and
wherein the first and the second mappings are different.

15. The apparatus according to claim 14, wherein the control information is not mapped to the at least one resource block of the set of resource blocks that at least partially overlaps with the broadcast control channel or signal.

16. The apparatus according to claim 14,
wherein the set of resource blocks is a first set of resource blocks,
wherein the control information is not mapped to a second set of resource blocks if the at least one resource block of the first set of resource blocks that at least partially overlaps with the broadcast control channel or signal belong to the second set of resource blocks, and
wherein the second set of resource blocks is a subset of the first set of resource blocks.

17. The apparatus according to claim 16, wherein the second set of resource blocks form a resource block group, where a resource block group is a unit of scheduling downlink data transmissions.

18. The apparatus according to claim 17, wherein the resource block group size is larger than 6 resource blocks.

19. The apparatus according to claim 14,
wherein the set of shortened resource element groups of the shortened control channel element is a first set of shortened resource element groups if at least one resource block of the set of resource blocks at least partially overlaps in frequency with a broadcast control channel or signal, and a second set of shortened resource element groups if none of the resource blocks of the set of resource blocks overlap in frequency with a broadcast control channel or signal,
and wherein the first and the second set of shortened resource element groups are different.

20. The apparatus according to claim 14, wherein the higher layer message configures the device for monitoring control channel candidates in at least one shortened transmission time interval in a subframe and the higher layer message indicates a set of resource blocks of control channel candidates in the at least one shortened transmission time interval.

\* \* \* \* \*